United States Patent
Kim et al.

(10) Patent No.: US 12,499,632 B2
(45) Date of Patent: Dec. 16, 2025

(54) ELECTRONIC DEVICE, METHOD, AND COMPUTER READABLE STORAGE MEDIUM FOR DISPLAYING IMAGE CORRESPONDING TO EXTERNAL SPACE ON VIRTUAL SPACE DISPLAYED THROUGH DISPLAY

(71) Applicant: SAMSUNG ELECTRONICS CO., LTD., Suwon-si (KR)

(72) Inventors: Bosung Kim, Suwon-si (KR); Jinsuk Lee, Suwon-si (KR); Junsik Jeong, Suwon-si (KR); Haksoo Kim, Suwon-si (KR); Donghyun Yeom, Suwon-si (KR); Jooyoung Kim, Suwon-si (KR); Hyuntaek Woo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 134 days.

(21) Appl. No.: 18/435,092

(22) Filed: Feb. 7, 2024

(65) Prior Publication Data

US 2024/0282059 A1    Aug. 22, 2024

Related U.S. Application Data

(63) Continuation of application No. PCT/KR2024/001090, filed on Jan. 23, 2024.

(30) Foreign Application Priority Data

Feb. 21, 2023  (KR) .................. 10-2023-0023235
Jun. 7, 2023   (KR) .................. 10-2023-0073070

(51) Int. Cl.
*G06T 19/00*  (2011.01)
*G06T 15/00*  (2011.01)

(52) U.S. Cl.
CPC .......... *G06T 19/006* (2013.01); *G06T 15/005* (2013.01)

(58) Field of Classification Search
None
See application file for complete search history.

(56) References Cited

U.S. PATENT DOCUMENTS

| 10,600,246 B2 | 3/2020 | Cartwright |
| 10,621,773 B2 | 4/2020 | Upadhyay |
| (Continued) | | |

FOREIGN PATENT DOCUMENTS

| CN | 114419099 A | 4/2022 |
| JP | 2023000948 A | 1/2023 |
| (Continued) | | |

OTHER PUBLICATIONS

Search Report and Written Opinion dated May 9, 2024 issued in International Patent Application No. PCT/KR2024/001090.

*Primary Examiner* — Tapas Mazumder
(74) *Attorney, Agent, or Firm* — Nixon & Vanderhye, P.C.

(57) ABSTRACT

One or more of at least one processor of a wearable device is configured to obtain an external image indicating at least a part of real environment around the wearable device using a camera, while displaying a three-dimensional image through a display. One or more of the at least one processor is configured to store the external image in a first command buffer distinct from a display buffer corresponding to the display in a memory. One or more of the at least one processor is configured to adjust an order among the first command buffer, the second command buffer and the third command buffer, using depth information corresponding to the first command buffer, a second command buffer corresponding to the three-dimensional image, and a third command buffer corresponding to a virtual object. This disclo- (Continued)

sure may be related to a metaverse service to enhance interconnectivity between a real object and a virtual object. For example, the metaverse service may be provided through a network based on fifth generation (5G) and/or sixth generation (6G).

20 Claims, 12 Drawing Sheets

(56) References Cited

U.S. PATENT DOCUMENTS

| | | | |
|---|---|---|---|
| 10,943,409 | B2 | 3/2021 | Ishihara et al. |
| 11,315,328 | B2 | 4/2022 | Aksoy et al. |
| 2017/0186236 | A1 | 6/2017 | Kawamoto |
| 2017/0287215 | A1 | 10/2017 | Lalonde |
| 2018/0101988 | A1* | 4/2018 | Murillo ................ G06F 3/011 |
| 2020/0327740 | A1 | 10/2020 | Frommhold et al. |
| 2021/0375044 | A1 | 12/2021 | George et al. |
| 2022/0283699 | A1* | 9/2022 | Presley .................. G06T 5/70 |
| 2023/0037750 | A1 | 2/2023 | Marra |
| 2023/0230333 | A1 | 7/2023 | Kawamae et al. |
| 2023/0316541 | A1 | 10/2023 | Huang |
| 2024/0265650 | A1 | 8/2024 | Lohr et al. |

FOREIGN PATENT DOCUMENTS

| | | |
|---|---|---|
| KR | 10-1838501 B1 | 3/2018 |
| KR | 20180102171 A | 9/2018 |
| KR | 10-2019-0080570 | 7/2019 |
| KR | 10-2298378 | 9/2021 |
| KR | 10-2021-0139369 | 11/2021 |
| KR | 10-2021-0154814 A | 12/2021 |
| WO | 2016/013269 A1 | 1/2016 |
| WO | 2022/044124 A1 | 3/2022 |
| WO | 2022/146712 A1 | 7/2022 |

* cited by examiner

ELECTRONIC DEVICE, METHOD, AND COMPUTER READABLE STORAGE MEDIUM FOR DISPLAYING IMAGE CORRESPONDING TO EXTERNAL SPACE ON VIRTUAL SPACE DISPLAYED THROUGH DISPLAY

CROSS-REFERENCE TO RELATED APPLICATIONS

This application is a continuation of International Application No. PCT/KR2024/001090 designating the United States, filed on Jan. 23, 2024, in the Korean Intellectual Property Receiving Office and claiming priority to Korean Patent Application Nos. 10-2023-0023235, filed on Feb. 21, 2023, in the Korean Intellectual Property Office, and 10-2023-0073070, filed on Jun. 7, 2023, in the Korean Intellectual Property Office, the disclosures of each of which are incorporated by reference herein in their entireties.

BACKGROUND

Field

The disclosure relates to an electronic device, a method, and a computer readable storage medium for displaying an image corresponding to an external space on a virtual space displayed through a display.

Description of Related Art

To provide enhanced user experience, an electronic device that provides an augmented reality (AR) service displaying information generated by a computer in conjunction with an external object in the real world is being developed. The electronic device may be a wearable device capable of being worn by a user. For example, the electronic device may be AR glasses and/or a head-mounted device (HMD).

SUMMARY

According to an example embodiment, a wearable device may comprise: memory including one or more storage mediums storing instructions, a display, a camera, and at least one processor including processing circuitry. The instructions that, when executed by the at least one processor individually or collectively, may cause the wearable device to obtain an external image indicating at least a part of real environment around the wearable device using the camera, while displaying a three-dimensional image through the display. The instructions that, when executed by the at least one processor individually or collectively, may cause the wearable device to store the external image in a first command buffer distinct from a display buffer corresponding to the display in the memory. The instructions that, when executed by the at least one processor individually or collectively, may cause the wearable device to adjust an order among the first command buffer, the second command buffer and the third command buffer, using depth information corresponding to the first command buffer, a second command buffer corresponding to the three-dimensional image, and a third command buffer corresponding to a virtual object. The instructions that, when executed by the at least one processor individually or collectively, may cause the wearable device to obtain a screen, to be displayed in the display and stored in the display buffer, by performing rendering on the first command buffer, the second command buffer, and the third command buffer using the adjusted order.

According to an example embodiment, a method by performed a wearable device may comprise obtaining an external image indicating at least a part of real environment around the wearable device using a camera, while displaying a three-dimensional image through a display. The method may comprise storing the external image in a first command buffer distinct from a display buffer corresponding to the display in a memory. The method may comprise adjusting an order among the first command buffer, the second command buffer and the third command buffer, using depth information corresponding to the first command buffer, a second command buffer corresponding to the three-dimensional image, and a third command buffer corresponding to a virtual object. The method may comprise obtaining a screen, to be displayed in the display and stored in the display buffer, by performing rendering on the first command buffer, the second command buffer, and the third command buffer using the adjusted order.

According to an example embodiment, a non-transitory computer-readable storage medium storing one or more programs, the one or more programs including instructions which, when executed by one or more of at least one processor of a wearable device, may cause the wearable device to obtain an external image indicating at least a part of real environment around the wearable device using a camera, while displaying a three-dimensional image through a display. The one or more programs, when executed by one or more of at least one processor of the wearable device, may include instructions which, when executed, cause the wearable device to store the external image in a first command buffer distinct from a display buffer corresponding to the display in a memory. The one or more programs, when executed by one or more of at least one processor of the wearable device, may, when executed, cause the wearable device to adjust an order among the first command buffer, the second command buffer and the third command buffer, using depth information corresponding to the first command buffer, a second command buffer corresponding to the three-dimensional image, and a third command buffer corresponding to a virtual object. The one or more programs, when executed by one or more of at least one processor of the wearable device, may include instructions which, when executed, cause the wearable device to obtain a screen, to be displayed in the display and stored in the display buffer, by performing rendering on the first command buffer, the second command buffer, and the third command buffer using the adjusted order.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
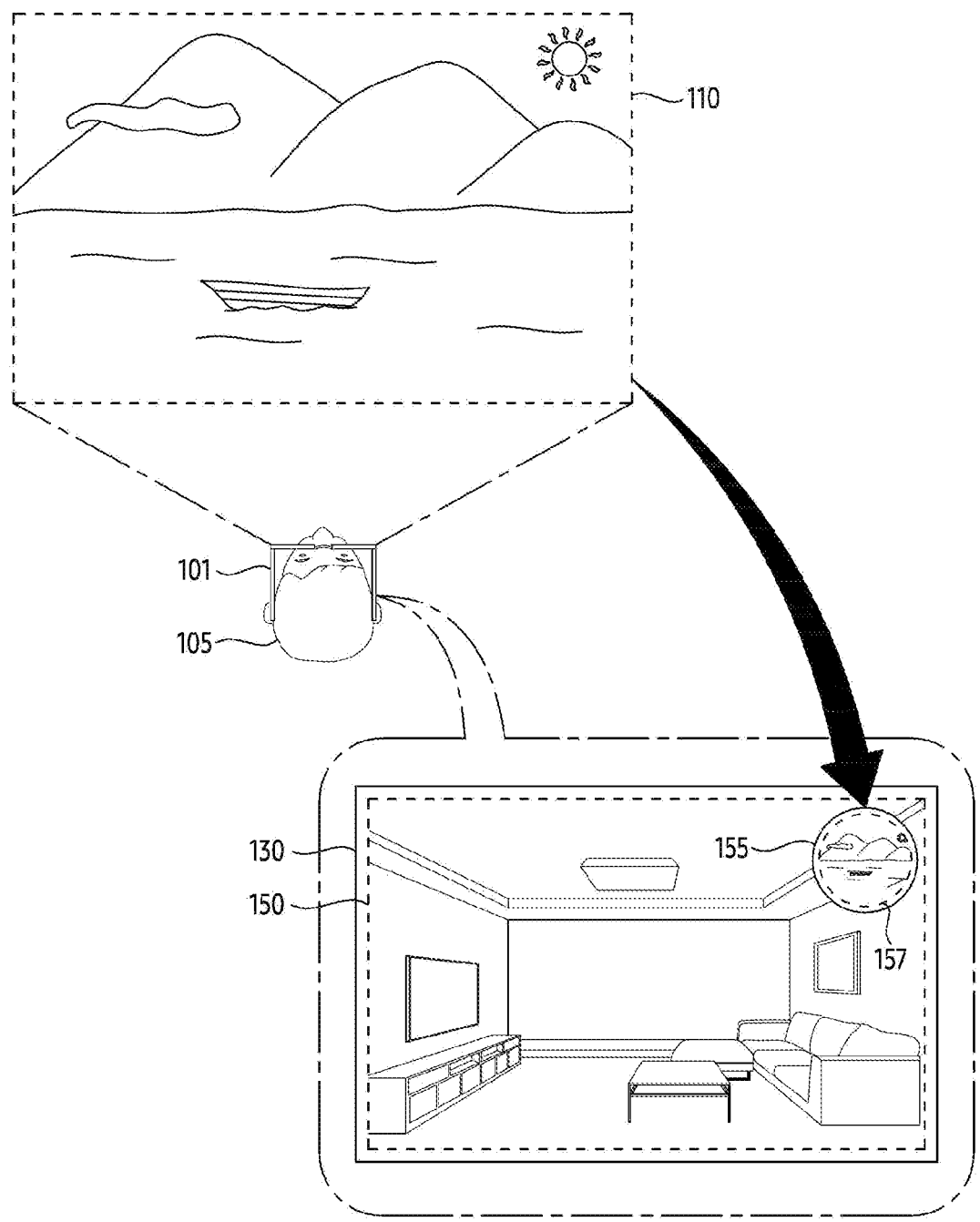
FIG. 1 is a diagram illustrating an example operation in which a wearable device displays an external image obtained through a camera on a virtual object, according to an embodiment.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and docs not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 101). For example, a processor (e.g., the processor 410) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a diagram illustrating an example operation in which a wearable device displays an external image obtained through a camera on a virtual object, according to an embodiment. The wearable device 101 of FIG. 1 may include a head-mounted display (HMD) wearable on a head of a user 105. The wearable device 101 according to an embodiment may include a camera (e.g., a camera 430 of FIG. 4) disposed toward a front of the user 105 in a state worn by the user 105. The front of the user 105 may include a direction in which the head of the user 105 and/or a gaze of the user 105 faces. According to an embodiment, the wearable device 101 may include a sensor for identifying the head of the user 105 and/or a motion of the wearable device 101 in a state worn by the user 105. The wearable device 101 may identify an angle of the wearable device 101 based on data of the sensor. To provide a user interface (UI) based on virtual reality (VR), augmented reality (AR), and/or mixed reality (MR) to the user 105 wearing the wearable device 101, the wearable device 101 may control the camera and/or the sensor. The UI may be related to a metaverse service and/or a notification service provided by the wearable device 101 and/or a server connected to the wearable device 101.

According to an embodiment, the wearable device 101 may execute a function related to augmented reality (AR) and/or mixed reality (MR). Referring to FIG. 1, in a state that the user 105 wears the wearable device 101, the wearable device 101 may include at least one lens disposed adjacent to eye of the user 105. Ambient light passing through the lens of the wearable device 101 may be combined (or mixed) with light emitted from a display (e.g., a display 420 of FIG. 4) of the wearable device 101. A display area of the display may be formed in a lens through which ambient light passes. Since the wearable device 101 combines the ambient light and the light emitted from the display, the user 105 may see an image in which a real object recognized by the ambient light and a virtual object formed by the light emitted from the display are mixed.

According to an embodiment, the wearable device 101 may execute a function related to video see-through (VST) and/or virtual reality (VR). In a state that the user 105 wears the wearable device 101, the wearable device 101 may include a housing covering eye of the user 105. The wearable device 101 may include a display disposed on a first surface (e.g., a first surface 310 of FIG. 3A) facing the eye within the state. The wearable device 101 may include a camera (e.g., cameras 260-7, 260-8, 260-9, 260-10, 260-11, and 260-12 of FIG. 3b) disposed on a second surface (e.g., a second surface 320 of FIG. 3A) opposite to the first surface. The wearable device 101 may obtain multiple frame images including ambient light using the camera. The wearable device 101 may output the frame images to the display disposed on the first surface so that the user 105 may recognize the ambient light through the display. The display area of the display disposed on the first surface may be formed by one or more pixels included in the display. The wearable device 101 may synthesize the virtual object within frame images output through the display, in order that the user 105 recognizes the virtual object along with a real object recognized by ambient light.

According to an embodiment, the wearable device 101 may provide a user experience based on mixed reality (MR) using a virtual space. The wearable device 101 may generate a virtual space mapped to an external space, by recognizing the external space (e.g., a real space) including the wearable device 101. Recognizing an external space by the wearable device 101 may include obtaining information on a size of the external space (e.g., a size of an external space divided by a side wall, a floor surface, and/or a ceiling surface). Recognizing an external space by the wearable device 101 may include identifying an external plane (e.g., a ceiling, and/or a floor) included in the external space. Identifying an external space by the wearable device 101 may include identifying a virtual object (e.g., a user interface (UI) for displaying at least one image) displayed in a display.

According to an embodiment, the wearable device 101 may provide the user 105 with an external object (or an existence object) recognized by ambient light and a visual object (or virtual object) displayed by the display. For example, the wearable device 101 may obtain an image 110 corresponding to a user's gaze obtained using a sensor. The image 110 may be obtained using a camera of the wearable device 101. For example, the image 110 may correspond to field-of-view (FoV) of the user 105. For example, the image 110 may correspond to field-of-view (FoV) of the camera of the wearable device 101. The image 110 may be referred to as an external image 110, in terms of indicating at least a part of a real environment around the wearable device identified through the camera. For example, the image 110 may be referred to as a frame image, in terms of corresponding to at least one of a plurality of frame images obtained through a camera.

For example, the wearable device 101 may receive an input to obtain the external image 110, while displaying a three-dimensional image 150 corresponding to a virtual environment (or virtual space). The three-dimensional image 150 may be obtained based on execution of at least one software application installed in the wearable device 101. The three-dimensional image 150 may include a virtual object 155 for interacting with the user 105 of the wearable device 101. For example, in order to display the virtual object 155 in the three-dimensional image 150, the wearable device 101 may obtain spatial information on a virtual space corresponding to the three-dimensional image 150. The wearable device 101 may identify a location of the virtual object 155 in the virtual space, using the spatial information. The spatial information may be referred to as reference space information in terms of being used to identify the location of the virtual object 155.

For example, the wearable device 101 may initiate driving the camera based on receiving an input to obtain the external image 110. The wearable device 101 may obtain an external image 110 corresponding to a gaze of the user 105 using a camera. For example, the external image 110 may be obtained based on color information from among color information or depth information. The wearable device 101 may store the external image 110 in a command buffer distinct from a display buffer corresponding to the display in a memory of the wearable device 101. The display buffer may store information on a screen 130 to be displayed on the display. For example, the display buffer may refer to an area of a memory in which information on the screen is at least temporarily stored to display the screen on the display. The wearable device 101 may display the screen 130 on the display using information on the screen 130 stored in the display buffer. For example, the screen 130 may refer to a user interface (UI) displayed in at least a part of the display. For example, the screen 130 may include activity of an Android operating system. Within the screen 130, the wearable device 101 may display one or more visual objects (or one or more virtual objects). A visual object may refer to a deployable object within the screen for transmission of information and/or interaction, such as a text, an image, an icon, a video, a button, a check box, a radio button, a text box, a slider and/or a table. The visual object may be referred to as a visual guide, a virtual object, a visual element, an UI element, a view object and/or a view element.

For example, the command buffer may be used by the wearable device 101 to render a screen to be displayed on the display. The command buffer may correspond to each of images obtained using each of one or more programs (e.g., a software application, a library, and/or a service) installed in the wearable device 101. The command buffer may store an image layer indicating an image used to render the screen to be displayed on the display. For example, the command buffer may refer to an area of a memory in which the image layer is at least temporarily stored to render the screen.

The wearable device 101 may obtain the screen to be displayed on the display, by rendering image layers corresponding to each of the obtained images. A screen to be obtained by the wearable device 101 based on an order of the image layers may be various. An operation in which the wearable device 101 renders an image layer based on a designated order will be described in greater detail below with reference to FIGS. 5 to 8.

For example, the wearable device 101 may display the external image 110 on at least a part 157 of the virtual object 155 displayed on a location of the three-dimensional image 150 identified using spatial information on the three-dimensional image 150. The wearable device 101 may display the external image 110 on at least a part 157 of the virtual object 155, based on adjusting an order of a first command buffer corresponding to the external image 110, a second command buffer corresponding to the three-dimensional image 150, and a third command buffer corresponding to the virtual object 155. For example, adjusting the order of the first command buffer corresponding to the external image 110, the second command buffer corresponding to the three-dimensional image 150, and the third command buffer corresponding to the virtual object 155 may refer to adjusting an order of image layers stored in each of the command buffers. For example, the third command buffer may be included in the second command buffer from a perspective in which the virtual object 155 may be included in the three-dimensional image 150. However, it is not limited to the example described above.

For example, adjusting an order of command buffers by the wearable device 101 may include adjusting the order to superimpose images corresponding to each of the command buffers. The order to superimpose images may include arranging to render image layers corresponding to each of the images. Arranging to render image layers may include stacking each of the image layers on a reference image layer based on the reference image layer. An image corresponding to the reference image layer may correspond to an image that has a relatively farthest distance from the user 105 of the wearable device 101, based on depth information on each of images corresponding to each of the image layers. However, it is not limited thereto. For example, the wearable device 101 may adjust the order without using depth information corresponding to each of images. An operation of adjusting the order of the command buffers by the wearable device 101 will be described in greater detail below with reference to FIG. 8.

For example, the wearable device 101 may perform rendering for the first command buffer, the second command buffer, and/or the third command buffer based on adjusting the order of the command buffers. The wearable device 101 may obtain a screen 130 stored in a display buffer and to be displayed through the display, by performing rendering. The wearable device 101 may arrange an image layer corresponding to the virtual object 155 on the image layer corresponding to the three-dimensional image 150, based on identifying an image layer corresponding to the second command buffer corresponding to the three-dimensional image 150 as a reference layer, based on the adjusted order. To display an external image 110 on at least a part 157 of the virtual object 155, the wearable device 101 may arrange an image layer corresponding to the external image 110 on an image layer corresponding to the virtual object 155. The wearable device 101 may obtain the screen 130 by rendering so that the virtual object 155 and the external image 110 are superimposed and displayed on the three-dimensional image 150. The screen 130 may include the external images 110, the virtual object 155, and the three-dimensional images 150 superimposed based on the order. The external image 110 may be referred to as a pass-through image from a perspective that a surrounding environment of the wearable device 101 is shown to the user 105 by passing through the three-dimensional image 150.

For example, the wearable device 101 may change a shape of the external image 110 corresponding to field-of-view (FoV) of a camera using a shape of the virtual object 155, based on location information of the virtual object 155 displayed on a location. Referring to FIG. 1, the shape of the virtual object 155 is illustrated in a spherical/circular shape, but is not limited thereto. The shape of the virtual object 155 may include a shape of a two-dimensional closed curve such as a circle, an ellipse, a triangle, and a square, or a three-dimensional closed curve such as a sphere, a rectangular parallelepiped, and a cube.

For example, the wearable device 101 may obtain location information of the virtual object 155, using spatial information on a virtual environment corresponding to the three-dimensional image 150. The wearable device 101 may identify a shape (e.g., circle) of at least a part 157 of the virtual object 155 to be displayed on the display, using location information of the virtual object 155. The wearable device 101 may change a shape of the external image 110 (e.g., a rectangular shape) based on the shape of at least a part 157. The location information of the virtual object 155 may include location information of at least a part 157 of the virtual object 155. For example, the wearable device 101 may change a size of the external image 110 corresponding to FoV of a camera to a size of at least a part 157 of the virtual object 155. The wearable device 101 may obtain the screen 130 based on adjusting an order of a first command buffer including the external image 110 changed in a shape and/or a size, a second command buffer including the three-dimensional image 150, and/or the third command buffer including the virtual object 155. The wearable device 101 may display the screen 130 through the display, based on storing the information on the obtained screen 130 in the display buffer.

As described above, according to an embodiment, the wearable device 101 may obtain the screen 130 by rendering the three-dimensional image 150 and the virtual object 155 displayed on the display and/or the external image 110 obtained through the camera. To obtain the screen 130, the wearable device 101 may adjust an order of command buffers corresponding to each of the three-dimensional image 150, the virtual object 155, and the external image 110. Based on adjusting the order, the wearable device 101 may obtain the screen 130 in which the external image 110 is displayed on the virtual object 155. The wearable device 101 may provide a user experience capable of interacting with an external environment based on displaying the external image 110 on the virtual object 155.

Figure 2A:
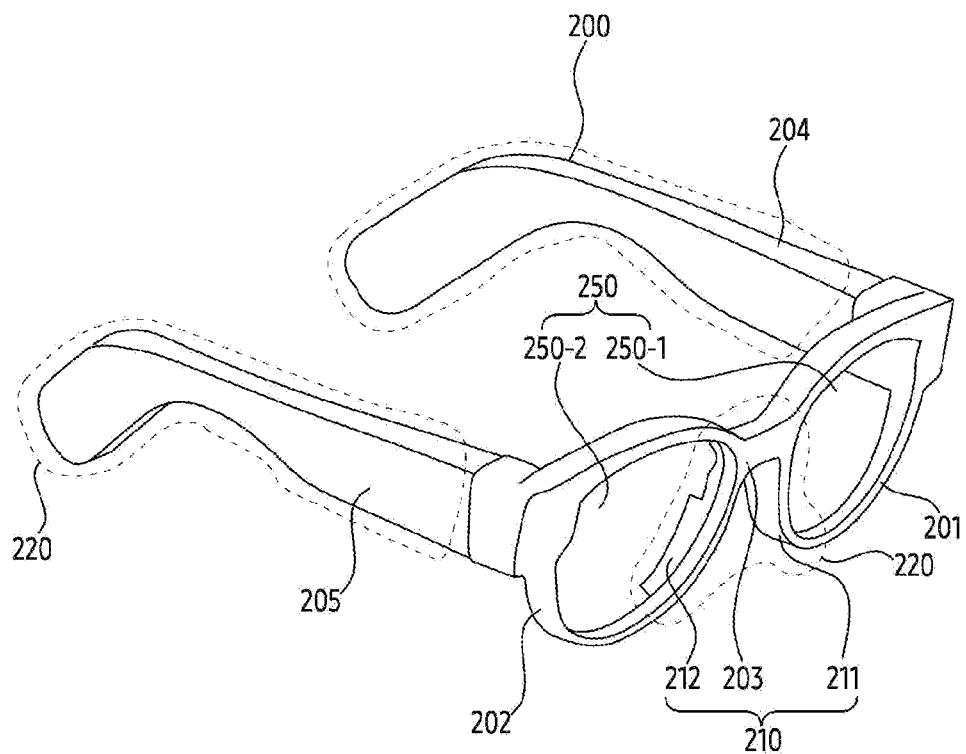
FIG. 2A is a perspective view illustrating an example wearable device, according to an embodiment.
Figure 2B:
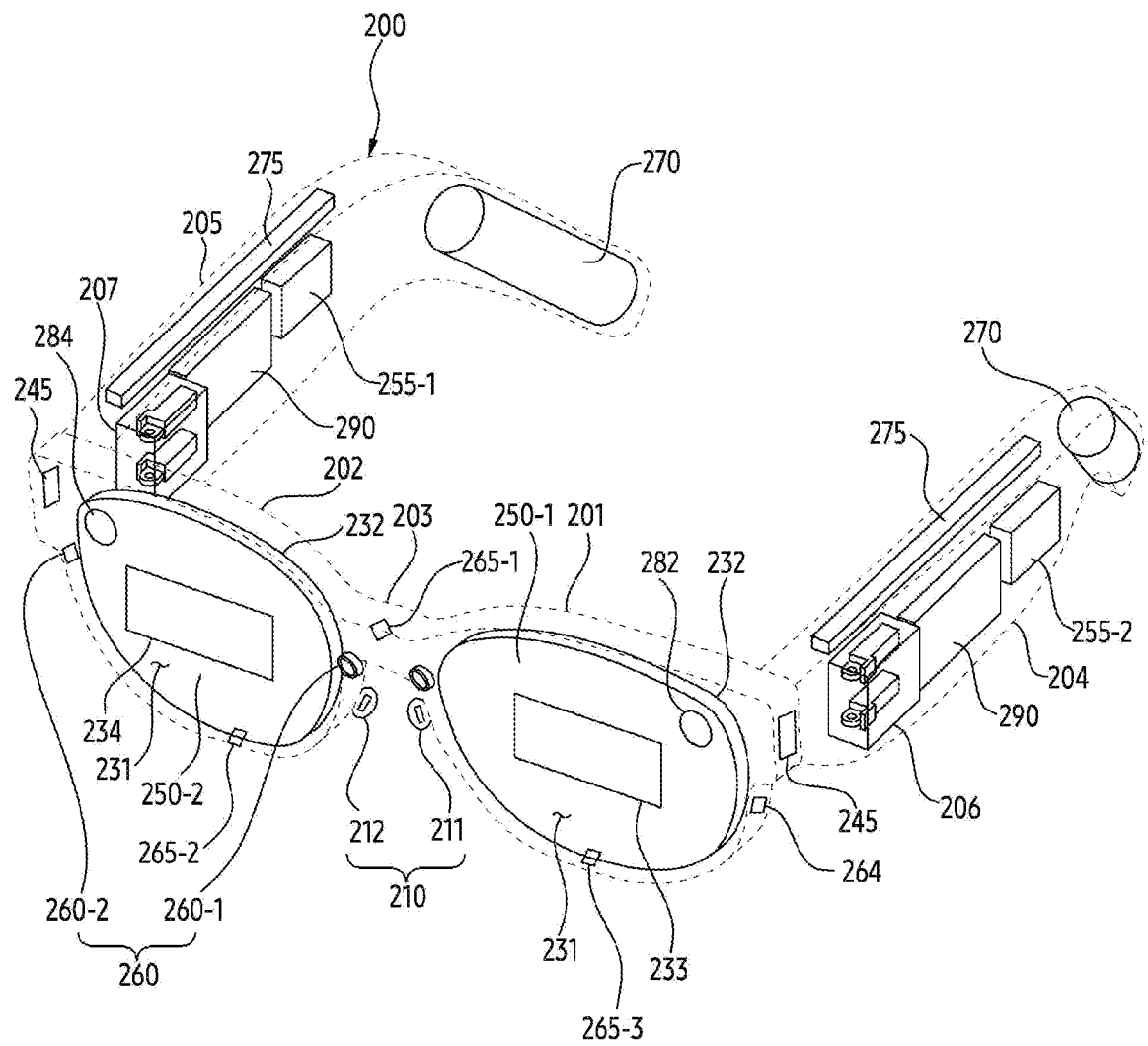
FIG. 2B is a perspective view illustrating an example hardware configuration of a wearable device, according to an embodiment.

FIG. 2A is a perspective view illustrating an example wearable device, according to an embodiment. FIG. 2B is a perspective view illustrating an example hardware configuration of a wearable device, according to an embodiment. According to an embodiment, the wearable device 101 may, for example, and without limitation, have a shape of glasses wearable on a user's body part (e.g., head). The wearable device 101 of FIGS. 2A to 2B may be an example of the electronic device 101 of FIG. 1. The wearable device 101 may include a head-mounted display (HMD). For example, a housing of the wearable device 101 may include a flexible material such as rubber and/or silicone that is in close contact with a part (e.g., a part of a face covering two eyes) of the user's head. For example, the housing of the wearable device 101 may include one or more straps able to be twined around the user's head and/or one or more temples attachable to the head's ear.

Referring to FIG. 2A, according to an embodiment, the wearable device 101 may include at least one display 250 and a frame 200 supporting the at least one display 250.

According to an embodiment, the wearable device 101 may be worn on a part of the user's body. The wearable device 101 may provide augmented reality (AR), virtual reality (VR), or mixed reality (MR) in which augmented reality and virtual reality are mixed to a user wearing the wearable device 101. For example, the wearable device 101 may display a virtual reality image provided by at least one optical device 282 and 284 in FIG. 2B on at least one display 250, in response to a user's designated gesture obtained through motion recognition cameras 260-2 and 264 in FIG. 2B.

According to an embodiment, the at least one display 250 may provide visual information to a user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be disposed at a location corresponding to the user's left and right eyes, respectively.

Referring to FIG. 2B, the at least one display 250 may provide visual information transmitted from ambient light to the user through a lens included in the at least one display 250 and other visual information distinct from the visual information. The lens may be formed based on at least one of a Fresnel lens, a pancake lens, or a multi-channel lens. For example, the at least one display 250 may include a first surface 231 and a second surface 232 opposite to the first surface 231. A display area may be formed on the second surface 232 of the at least one display 250. When the user wears the wearable device 101, ambient light may be incident on the first surface 231 and transmitted through the second surface 232, thereby being transmitted to the user. For another example, the at least one display 250 may display an augmented reality image in which a reality screen transmitted through ambient light and a virtual reality image provided by at least one optical device 282 and 284 are combined on a display area formed on the second surface 232.

According to an embodiment, the at least one display 250 may include the waveguides 233 and 234 that diffracts light transmitted from the at least one optical device 282 and 284 and transmits it to the user. The at least one waveguides 233 and 234 may be formed based on at least one of glass, plastic, or polymer. A nano pattern may be formed on at least a part of the outside or inside of the at least one waveguides 233 and 234. The nano pattern may be formed based on a grating structure having a polygonal or curved shape. Light incident to one end of the waveguides 233 and 234 may be propagated to other end of the at least one waveguides 233 and 234 by the nano pattern. The at least one waveguides 233 and 234 may include at least one of at least one diffraction element (e.g., a diffractive optical element (DOE), a holographic optical element (HOE)), and a reflection element (e.g., a reflection mirror). For example, the at least one wave guide 233 and 234 may be disposed within the wearable device 101 to guide a screen displayed by the at least one display 250 to the user's eyes. For example, the screen may be transmitted to the user's eyes based on total internal reflection (TIR) generated within the at least one wave guide 233 and 234.

According to an embodiment, the wearable device 101 may analyze an object included in a real image collected through a photographing camera 245, combine virtual object corresponding to an object that become a subject of augmented reality provision among the analyzed object, and display them on the at least one display 250. The virtual object may include at least one of text and images for various information associated with the object included in the real image. The wearable device 101 may analyze the object based on a multi-camera such as a stereo camera. For the object analysis, the wearable device 101 may execute simultaneous localization and mapping (SLAM) using time-of-flight (ToF) and/or the multi-camera. The user wearing the wearable device 101 may watch an image displayed on the at least one display 250.

According to an embodiment, the frame 200 may be configured with a physical structure in which the wearable device 101 may be worn on the user's body. According to an embodiment, the frame 200 may be configured so that the first display 250-1 and the second display 250-2 are located corresponding to the user's left and right eyes when the user wears the wearable device 101. The frame 200 may support at least one display 250. For example, the frame 200 may support the first display 250-1 and the second display 250-2 to be located in locations corresponding to the user's left and right eyes.

Referring to FIG. 2A, the frame 200 may include an area 220 at least partially in contact with a part of the user's body when the user wears the wearable device 101. For example, the area 220 of the frame 200 in contact with a part of the user's body may include an area contacting a portion of the user's nose, a portion of the user's ear, and a portion of the side of the user's face in which the wearable device 101 contacts. According to an embodiment, the frame 200 may include a nose pad 210 contacting a part of the user's body. When the user wears the wearable device 101, the nose pad 210 may be in contact with a part of the user's nose. The frame 200 may include a first temple 204 and a second temple 205 contacting with another part of the user's body distinct from the part of the user's body.

For example, the frame 200 may include a first rim 201 surrounding at least a part of the first display 250-1, a second rim 202 surrounding at least a part of the second display 250-2, a bridge 203 disposed between the first rim 201 and the second rim 202, a first pad 211 disposed along a part of a periphery of the first rim 201 from an end of the bridge 203, a second pad 212 disposed along a part of a periphery of the second rim 202 from another end of the bridge 203, a first temple 204 extending from the first rim 201 and fixed to a part of an ear of a wearer, and a second temple 205 extending from the second rim 202 and fixed to a part of an opposite ear of the car. The first pad 211 and the second pad 212 may contact a part of the user's nose, and the first temple 204 and the second temple 205 may contact a part of the user's face and a part of the ear. The temple 204 and 205 may be rotatably connected to the rim through hinge units 206 and 207 in FIG. 2B. The first temple 204 may be rotatably connected to the first rim 201 through a first hinge unit 206 disposed between the first rim 201 and the first temple 204.

The second temple 205 may be rotatably connected to the second rim 202 through a second hinge unit 207 disposed between the second rim 202 and the second temple 205. According to an embodiment, using a touch sensor, a grip sensor, and/or a proximity sensor formed on at least a part of the surface of frame 200, the wearable device 101 may identify an external object touching the frame 200 (e.g., a user's fingertip) and/or a gesture performed by the external object.

According to an embodiment, the wearable device 101 may include hardware (e.g., hardware to be described in greater detail below based on a block diagram of FIG. 4) that performs various functions. For example, the hardware may include a battery module 270, an antenna module 275, at least one optical device 282 and 284, speakers (e.g., speakers 255-1, 255-2), a microphone (e.g., microphones 265-1, 265-2, 265-3), a light emitting module (not shown), and/or a printed circuit board (PCB) 290 (e.g., a printed circuit board). Various hardware may be disposed in the frame 200.

According to an embodiment, a microphone (e.g., microphones 265-1, 265-2, 265-3) of the wearable device 101 may be disposed on at least a part of the frame 200, and obtain a sound signal. A first microphone 265-1 disposed on the bridge 203, a second microphone 265-2 disposed on the second rim 202, and a third microphone 265-3 disposed on the first rim 201 are illustrated in FIG. 2B, but the number and arrangement of the microphones 265 are not limited to an embodiment of FIG. 2B. When the number of the microphones 265 included in the wearable device 101 is two or more, the wearable device 101 may identify a direction of the sound signal using a plurality of microphones disposed on different parts of the frame 200.

According to an embodiment, the at least one optical device 282 and 284 may project a virtual object on the at least one display 250, in order to provide various image information to the user. For example, the at least one optical device 282 and 284 may be a projector. The at least one optical device 282 and 284 may be disposed adjacent to the at least one display 250, or may be included in the at least one display 250 as a part of the at least one display 250. According to an embodiment, the wearable device 101 may include a first optical device 282 corresponding to the first display 250-1 and a second optical device 284 corresponding to the second display 250-2. For example, the at least one optical device 282 and 284 may include the first optical device 282 disposed at a periphery of the first display 250-1 and the second optical device 284 disposed at a periphery of the second display 250-2. The first optical device 282 may transmit light to the first waveguide 233 disposed on the first display 250-1, and the second optical device 284 may transmit light to the second waveguide 234 disposed on the second display 250-2.

In an embodiment, the camera 260 may include a photographing camera 245, an eye tracking camera (ET CAM) 260-1, and/or a motion recognition camera 260-2. The photographing camera 245, the eye tracking camera 260-1, and the motion recognition cameras 260-2 and 264 may be disposed at different locations on the frame 200 and may perform different functions. The eye tracking camera 260-1 may output data indicating a gaze of a user wearing the wearable device 101. For example, the wearable device 101 may detect the gaze from an image including the user's pupils and obtained through the eye tracking camera 260-1. An example in which the eye tracking camera 260-1 is disposed toward the user's right eye is illustrated in FIG. 2B, but embodiments are not limited thereto, and the eye tracking camera 260-1 may be disposed alone toward the user's left eye or may be disposed toward both two eyes.

In an embodiment, the photographing camera 245 may photograph a real image or real background to be matched with a virtual image to implement augmented reality or mixed reality content. The photographing camera 245 may photograph an image of a specific object existing at a location where the user is looking, and provide the image to the at least one display 250. The at least one display 250 may display one image in which a real image or background information including an image of the specific object obtained using the photographing camera 245 and a virtual image provided through the at least one optical device 282 and 284 are superimposed. In an embodiment, the photographing camera 245 may be disposed on the bridge 203 disposed between the first rim 201 and the second rim 202.

By tracking a gaze of the user wearing the wearable device 101, the eye tracking camera 260-1 may implement a more realistic augmented reality by matching the user's gaze with visual information provided on the at least one display 250. For example, when the user looks at the front, the wearable device 101 may naturally display environmental information related to the user's front at a location where the user is located on the at least one display 250. The eye tracking camera 260-1 may be configured to capture an image of the user's pupil in order to determine the user's gaze. For example, the eye tracking camera 260-1 may receive gaze detection light reflected from the user's pupil and track the user's gaze based on a location and movement of the received gaze detection light. In an embodiment, the eye tracking camera 260-1 may be disposed at a location corresponding to the user's left and right eyes. For example, in the first rim 201 and/or the second rim 202, the eye tracking camera 260-1 may be disposed to face a direction in which the user wearing the wearable device 101 is located.

The motion recognition cameras 260-2 and 264 may provide a specific event to a screen provided to the at least one display 250 by recognizing movement of all or part of the user's body, such as the user's torso, hand, or face. The motion recognition cameras 260-2 and 264 may recognize the user's motion to obtain a signal corresponding to the motion and provide an indication corresponding to the signal to the at least one display 250. The processor may identify the signal corresponding to the motion and perform a designated function based on the identification. In an embodiment, the motion recognition cameras 260-2 and 264 may be disposed on the first rim 201 and/or the second rim 202.

The camera 260 included in the wearable device 101 is not limited to the eye tracking camera 260-1 and the motion recognition cameras 260-2 and 264 described above. For example, the wearable device 101 may identify an external object included in FoV using the camera 260 disposed toward the user's FoV. Identification of an external object by the wearable device 101 may be performed based on a sensor for identifying a distance between the wearable device 101 and the external object, such as a depth sensor and/or a time of flight (ToF) sensor. The camera 260 disposed toward the FoV may support autofocus function and/or optical image stabilization (OIS) function. For example, the wearable device 101 may include the camera 260 (e.g., a face tracking (FT) camera) disposed toward a face to obtain an image including the face of the user wearing the wearable device 101.

Although not illustrated, the wearable device 101 according to an embodiment may further include a light source (e.g., LED) that emits light toward a subject (e.g., eyes and face of the user, and/or an external object in FoV) photographed using the camera 260. The light source may include an LED having an infrared wavelength. The light source may be disposed on at least one of the frame 200 and the hinge units 206 and 207.

According to an embodiment, the battery module 270 may supply power to electronic components of the wearable device 101. In an embodiment, the battery module 270 may be disposed in the first temple 204 and/or the second temple 205. For example, the battery module 270 may be a plurality of battery modules 270. The plurality of battery modules 270 may be disposed in each of the first temple 204 and the second temple 205. In an embodiment, the battery module 270 may be disposed at an end portion of the first temple 204 and/or the second temple 205.

The antenna module 275 may transmit a signal or power to the outside of the wearable device 101 or receive a signal or power from the outside. In an embodiment, the antenna module 275 may be disposed in the first temple 204 and/or the second temple 205. For example, the antenna module 275 may be disposed close to one surface of the first temple 204 and/or the second temple 205.

The speaker 255 may output an acoustic signal to the outside of the wearable device 101. A sound output module may be referred to as a speaker. In an embodiment, the speaker 255 may be disposed in the first temple 204 and/or the second temple 205 to be disposed adjacent to ear of the user wearing the wearable device 101. For example, the speaker 255 may include a second speaker 255-2 disposed adjacent to the user's left ear by being disposed in the first temple 204, and a first speaker 255-1 disposed adjacent to the user's right ear by being disposed in the second temple 205.

The light emitting module (not shown) may include at least one light emitting element. In order to visually provide information on a specific state of the wearable device 101 to the user, the light emitting module may emit light of a color corresponding to a specific state or may emit light in an operation corresponding to a specific state. For example, when the wearable device 101 needs to be charged, the wearable device 101 may emit red light at a predetermined period. In an embodiment, the light emitting module may be disposed on the first rim 201 and/or the second rim 202.

Referring to FIG. 2B, according to an embodiment, the wearable device 101 may include a printed circuit board (PCB) 290. The PCB 290 may be included in at least one of the first temple 204 and the second temple 205. The PCB 290 may include an interposer disposed between at least two sub-PCBs. One or more hardware (e.g., hardware illustrated by different blocks in FIG. 4) included in the wearable device 101 may be disposed on the PCB 290. The wearable device 101 may include a flexible PCB (FPCB) for interconnecting the hardware.

According to an embodiment, the wearable device 101 may include at least one of a gyro sensor, a gravity sensor, and/or an acceleration sensor for detecting the posture of the wearable device 101 and/or the posture of a body part (e.g., a head) of the user wearing the wearable device 101. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 101 may identify the user's motion and/or gesture performed to execute or stop a specific function of the wearable device 101 based on the IMU.

Figure 3A:
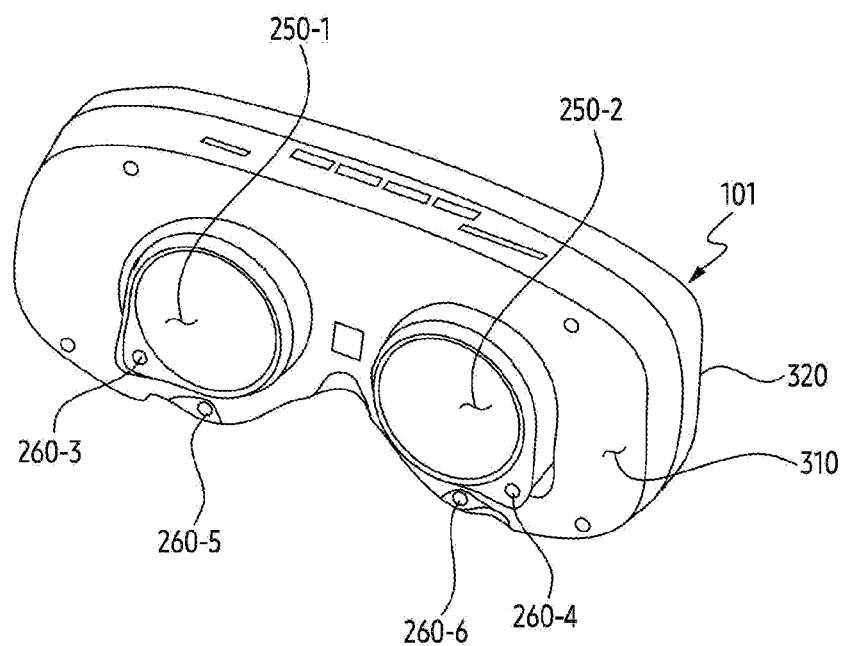
FIGS. 3A and 3B are perspective views illustrating an example of an exterior of a wearable device, according to an embodiment.
Figure 3B:
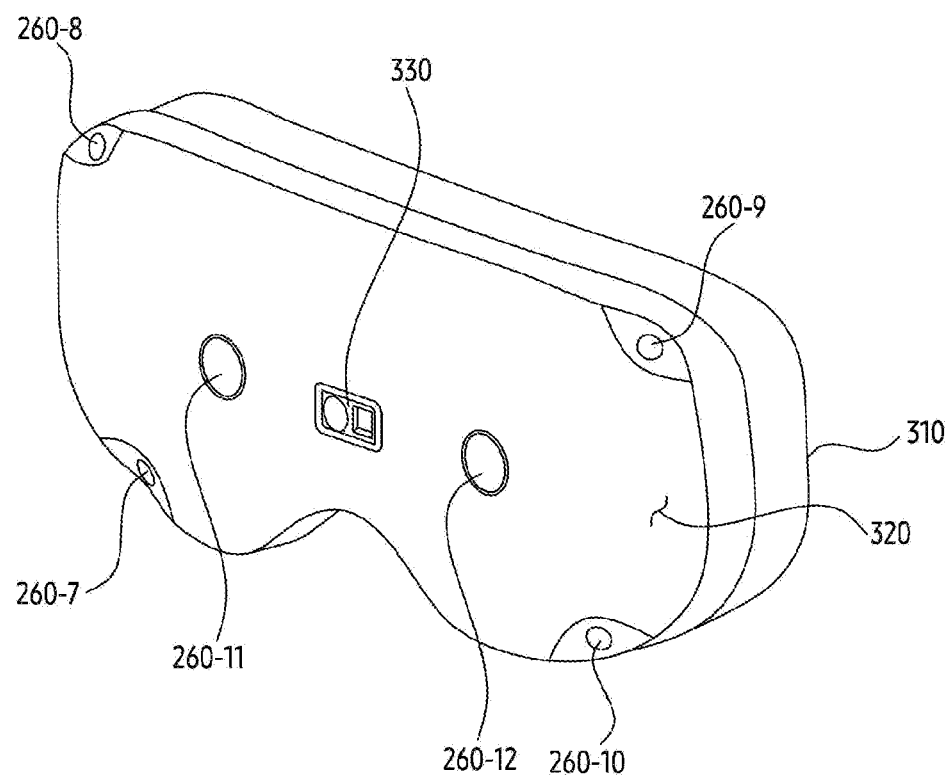

FIGS. 3A and 3B are perspective views illustrating an example of an exterior of a wearable device, according to an embodiment. The wearable device 101 of FIGS. 3A and 3B may be an example of the wearable device 101 of FIG. 1. According to an embodiment, an example of the exterior of a first surface 310 of a housing of the wearable device 101 may be illustrated in FIG. 3A, and an example of the exterior of a second surface 320 opposite to the first surface 310 may be illustrated in FIG. 3B.

Referring to FIG. 3A, according to an embodiment, the first surface 310 of the wearable device 101 may have an attachable shape on the user's body part (e.g., the user's face). Although not illustrated, the wearable device 101 may further include a strap for being fixed on the user's body part, and/or one or more temples (e.g., a first temple 204 and/or a second temple 205 of FIGS. 2A and 2B). A first display 250-1 for outputting an image to the left eye among the user's two eyes and a second display 250-2 for outputting an image to the right eye among the user's two eyes may be disposed on the first surface 310. The wearable device 101 may be formed on the first surface 310 and may further include rubber or silicon packing for preventing and/or reducing interference by light (e.g., ambient light) different from the light emitted from the first display 250-1 and the second display 250-2.

According to an embodiment, the wearable device 101 may include cameras 260-3 and 260-4 for photographing and/or tracking two eyes of the user adjacent to each of the first display 250-1 and the second display 250-2. The cameras 260-3 and 260-4 may be referred to as ET cameras. According to an embodiment, the wearable device 101 may include cameras 260-5 and 260-6 for photographing and/or recognizing the user's face. The cameras 260-5 and 260-6 may be referred to as FT cameras.

Referring to FIG. 3B, according to an embodiment, a camera (e.g., cameras 260-7, 260-8, 260-9, 260-10, 260-11, 260-12), and/or a sensor (e.g., a depth sensor 330) for obtaining information associated with the external environment of the wearable device 101 may be disposed on the second surface 320 opposite to the first surface 310 of FIG. 3A. For example, the cameras 260-7, 260-8, 260-9, 260-10, 260-11, and 260-12 may be disposed on the second surface 320 in order to recognize an external object. For example, using cameras 260-11, and 260-12, the wearable device 101 may obtain an image and/or video to be transmitted to each of the user's two eyes. The camera 260-11 may be disposed on the second surface 320 of the wearable device 101 to obtain an image to be displayed through the second display 250-2 corresponding to the right eye among the two eyes. The camera 260-12 may be disposed on the second surface 320 of the wearable device 101 to obtain an image to be displayed through the first display 250-1 corresponding to the left eye among the two eyes.

According to an embodiment, the wearable device 101 may include the depth sensor 330 disposed on the second surface 320 to identify a distance between the wearable device 101 and an external object. Using the depth sensor 330, the wearable device 101 may obtain spatial information (e.g., depth map) on at least a part of FoV of the user wearing the wearable device 101. Although not illustrated, a microphone for obtaining sound output from the external object may be disposed on the second surface 320 of the wearable device 101. The number of microphones may be one or more, according to an embodiment.

As described above, according to an embodiment, the wearable device 101 may obtain an external image (e.g., the external image 110 in FIG. 1) corresponding to an external environment through a camera (e.g., the camera 260), while displaying a three-dimensional image (e.g., the three-dimensional image 150 in FIG. 1) corresponding to a virtual environment through the display. The wearable device 101 may obtain a screen (e.g., the screen 130 in FIG. 1) including a three-dimensional image and an external image, using command buffers corresponding to the three-dimensional image and the external image. Hereinafter, a hardware or software configuration of the wearable device 101 will be described in greater detail below with reference to FIG. 4.

Figure 4:
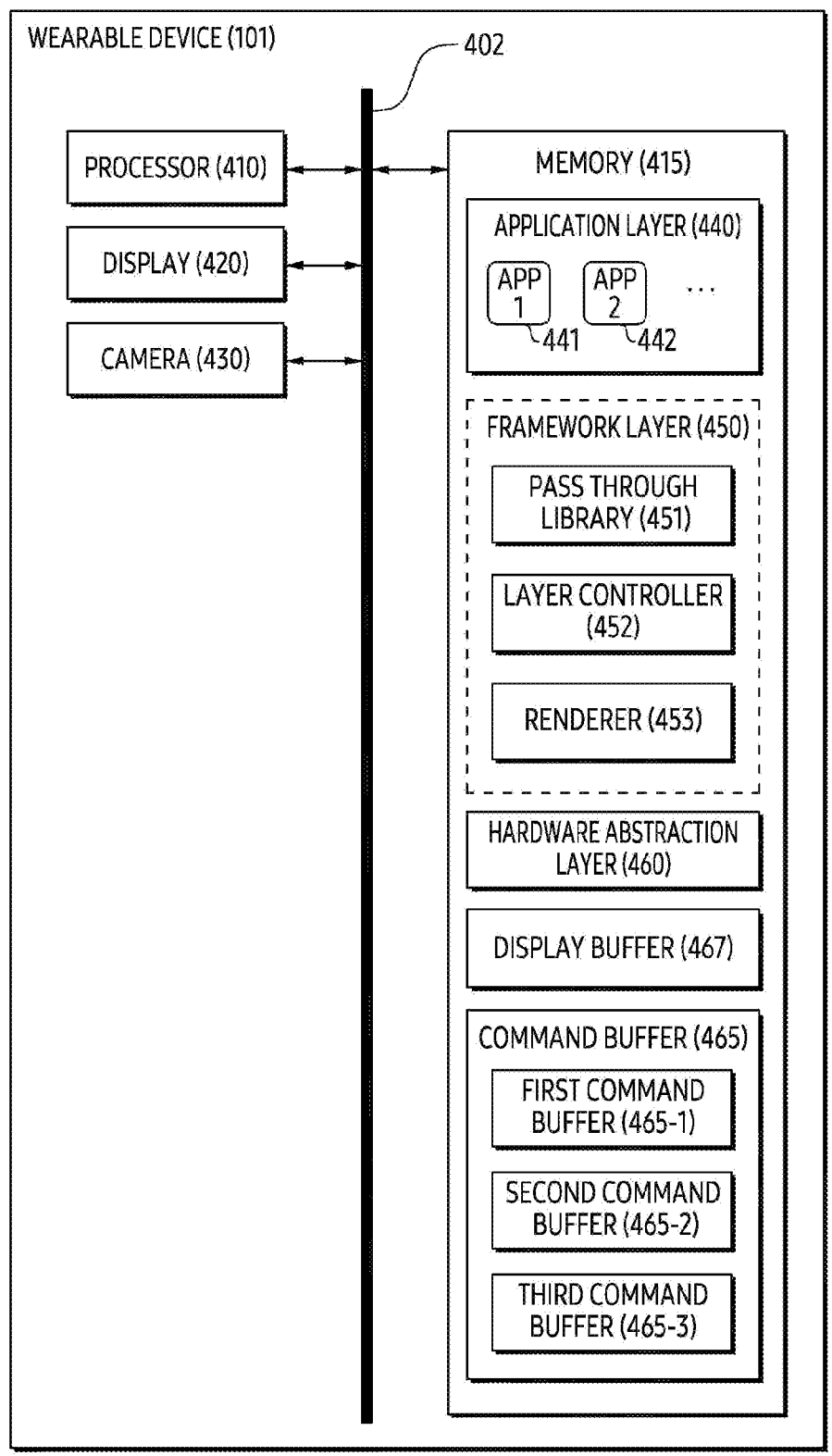
FIG. 4 is a block diagram illustrating an example configuration of a wearable device, according to an embodiment.

FIG. 4 is a block diagram illustrating an example configuration of a wearable device, according to an embodiment. The wearable device 101 of FIG. 4 may be an example of the wearable device 101 of FIG. 1 and the wearable device 101 of FIGS. 2A to 3B.

Referring to FIG. 4, according to an embodiment, the wearable device 101 may include at least one of a processor (e.g., including processing circuitry) 410, a memory 415, a display 420, and/or a camera 430. The processor 410, the memory 415, the display 420, and the camera 430 are electronically and/or operably coupled with each other by an electronical component such as a communication bus 402. The type and/or number of hardware components included in the wearable device 101 are not limited to those illustrated in FIG. 4. For example, the wearable device 101 may include only a part of the hardware components shown in FIG. 4.

According to an embodiment, the processor 410 of the wearable device 101 may include various processing circuitry (as used herein, including the claims, the term "processor" may include various processing circuitry, including at least one processor, wherein one or more processors of at least one processor may be configured to perform the various functions described herein) and include a hardware component for processing data based on one or more instructions. Hardware component for processing data may include, for example, and without limitation, an arithmetic and logical unit (ALU), a field programmable gate array (FPGA), and/or a central processing unit (CPU). A number of the processors 410 may be one or more. For example, the processor 410 may have a structure of a multi-core processor such as a dual core, a quad core, or a hexa core.

According to an embodiment, the memory 415 of the wearable device 101 may include a hardware component for storing data and/or instructions input and/or output to the processor 410. The memory 415 may include a volatile memory such as a random-access memory (RAM) and/or a non-volatile memory such as a read-only memory (ROM). For example, the volatile memory may include at least one of a dynamic RAM (DRAM), a static RAM (SRAM), a Cache RAM, and a pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disk, a solid state drive (SSD), and an embedded multimedia card (eMMC).

According to an embodiment, one or more instructions (or commands) indicating operation and/or calculation to be performed by one or more of at least one processor 410 of the wearable device 101 with respect to data may be stored in the memory 415 of the wearable device 101. A set of one or more instructions may be referred to as firmware, operating system, process, routine, sub-routine and/or application. For example, when a set of plurality of instructions distributed in a form of operating system, firmware, driver, and/or application is executed, the wearable device 101 and/or the processor 410 may perform at least one of operations of FIG. 9. Hereinafter, that an application is installed in the wearable device 101 may refer, for example, to one or more instructions provided in the form of an application being stored in the memory 415, and that the one or more applications are stored in a format (e.g., a file with an extension specified by the operating system of the wearable device 101) executable by the processor 410. For example, the application may include a program and/or a library related to a service provided to a user.

Referring to FIG. 4, programs installed in the wearable device 101 may be classified into any of different layers that includes an application layer 440, a framework layer 450, and/or a hardware abstraction layer (HAL) 460, based on a target. For example, in the hardware abstraction layer 460, programs (e.g., driver) designed to target hardware (e.g., the display 420 and/or the camera 430) of the wearable device 101 may be classified. For example, in the framework layer 450, programs (e.g., pass through library 451, layer controller 452, and/or renderer 453) designed to target at least one of the hardware abstraction layer 460 and/or the application layer 440 may be classified. Programs classified as the framework layer 450 may provide application programming interface (API) executable based on another program.

For example, within the application layer 440, a program designed to target a user (e.g., the user 105 of FIG. 1) controlling the wearable device 101 may be classified. A first software application 441 and/or a second software application 442 are illustrated as an example of programs classified as the application layer 440, but the embodiment is not limited thereto. For example, programs classified as the application layer 440 (e.g., software applications) may cause execution of a function supported by programs classified as the framework layer 450, by calling API.

For example, the first software application 441 may be an example of an application for providing a virtual space service. Based on execution of the first software application 441, the wearable device 101 may display the three-dimensional image 150 of FIG. 1 on the display 420.

For example, the second software application 442 may be an example of an application for providing a user interface available in a virtual space (e.g., the virtual object 155 in FIG. 1). However, it is not limited to the above-described embodiment. For example, the wearable device 101 may display the user interface on the display using the first software application 441.

For example, the memory 415 of the wearable device 101 may include a command buffer 465 for storing information to be used to perform rendering and/or a display buffer 467 for storing information on a screen to be displayed through the display 420, using the renderer 453. The command buffer 465 may correspond to images (e.g., the external image 110 or the three-dimensional image 150) obtained by the processor 410 of the wearable device 101 using at least one program. The command buffer 465 may be identified based on API (e.g., Vulkan) used by the processor 410 to process graphics. The command buffer 465 may be an area for storing data indicating at least one image in the memory 415. The command buffer 465 may be an area occupied by the data. The wearable device 101 may store data indicating each of the obtained images in the command buffer 465, using an address (e.g., a physical address or a logical address) indicating the command buffer 465. For example, the command buffer 465 may be divided into a first command buffer 465-1, a second command buffer 465-2, and/or a third command buffer 465-3 based on the physical address or the logical address.

For example, the wearable device 101 may store an external image (e.g., the external image 110 in FIG. 1) corresponding to an external space (real space) in the first command buffer 465-1, based on execution of the pass through library 451. An operation in which the wearable device 101 stores an external image in the first command buffer 465-1 may include storing data on the external image in the first command buffer 465-1. The first command buffer 465-1 may be a memory area accessible by the renderer 453. The external image (or external image layer) stored in the first command buffer 465-1 may be used by the renderer 453 to perform rendering. For example, the wearable device 101 may store information related to the external image in the first command buffer 465-1. The information related to the external image may include color information on the external image and/or information (e.g., field-of-view (FoV)) on the camera 430 used to obtain the external image. Hereinafter, storing at least one image in the command buffer may include storing information related to the at least one image.

For example, the wearable device 101 may store a three-dimensional image (e.g., the three-dimensional image 150 in FIG. 1) obtained based on execution of the first software application 441 in the second command buffer 465-2. An operation in which the wearable device 101 stores a three-dimensional image in the second command buffer 465-2 may include storing three-dimensional image information (e.g., spatial information for a virtual space corresponding to a three-dimensional image) used to display the three-dimensional image on the display. The three-dimensional image (or three-dimensional image layer) stored in the second command buffer 465-2 may be processed by the renderer 453.

For example, the wearable device 101 may store a virtual object (e.g., the virtual object 155 in FIG. 1) obtained based on execution of at least one of the first software application 441 or the second software application 442 in the third command buffer 465-3. An operation in which the wearable device 101 stores a virtual object in the third command buffer 465-3 may include storing virtual object information (e.g., location information) used to display the virtual object on the display. The virtual object (or virtual object layer) stored in the third command buffer 465-3 may be used by the renderer 453 to perform rendering.

For example, the wearable device 101 may change an order of the command buffer 465 based on execution of the layer controller 452. The wearable device 101 may change an order of the first command buffer 465-1, the second command buffer 465-2, and/or the third command buffer 465-3. Changing the order of the command buffer 465 by the wearable device 101 may include changing the order of an image layer corresponding to each of images stored in the command buffer 465. The wearable device 101 may process order information indicating the order obtained by changing the order of the image layer through the renderer 453. Based on the order, the wearable device 101 may obtain a screen (e.g., the screen 130 in FIG. 1) stored in the display buffer 467 and to be displayed through the display 420, by rendering images stored in the command buffer 465 using renderer 453. For example, the layer controller 452 may be included in the renderer 453. Hereinafter, an operation of changing an order of the command buffer 465 may include an operation of changing an order of an image layers stored in the command buffer 465.

According to an embodiment, the display 420 of the wearable device 101 may be controlled by a controller such as one or more of at least one processor 410 to output visualized information to the user. The display 420 may include a flat panel display (FPD) and/or an electronic paper. The FPD may include a liquid crystal display (LCD), a plasma display panel (PDP), and/or one or more light emitting diode (LED). The LED may include an organic LED (OLED). For example, the display 420 may be used to display an image obtained by the processor 410 or an image obtained by a display driving circuit. For example, the wearable device 101 may display the image on a part of the display 420 according to a control of the display driving circuit. The Embodiment is not limited thereto, and the display 420 may have at least a partially curved shape or a deformable shape.

According to an embodiment, the camera 430 of the wearable device 101 may include one or more optical sensors (e.g., a charged coupled device (CCD) sensor, a complementary metal oxide semiconductor (CMOS) sensor) that generate an electrical signal indicating color and/or brightness of light. A plurality of optical sensors in the camera 430 may be arranged in a form of a two-dimensional array. The camera 430 may substantially simultaneously obtain an electrical signal of each of the plurality of optical sensors to generate an image corresponding to light reaching the optical sensors of the two-dimensional array and including a plurality of pixels arranged in two dimensions. For example, photo data captured using the camera 430 may refer, for example, to an image obtained from the camera 430. For example, video data captured using the camera 430 may refer, for example, to a sequence of a plurality of images obtained according to a specified frame rate from the camera 430.

An example of an operation in which the wearable device 101 obtains a screen using images obtained using one or more programs will be described in greater detail below with reference to FIG. 5.

Figure 5:
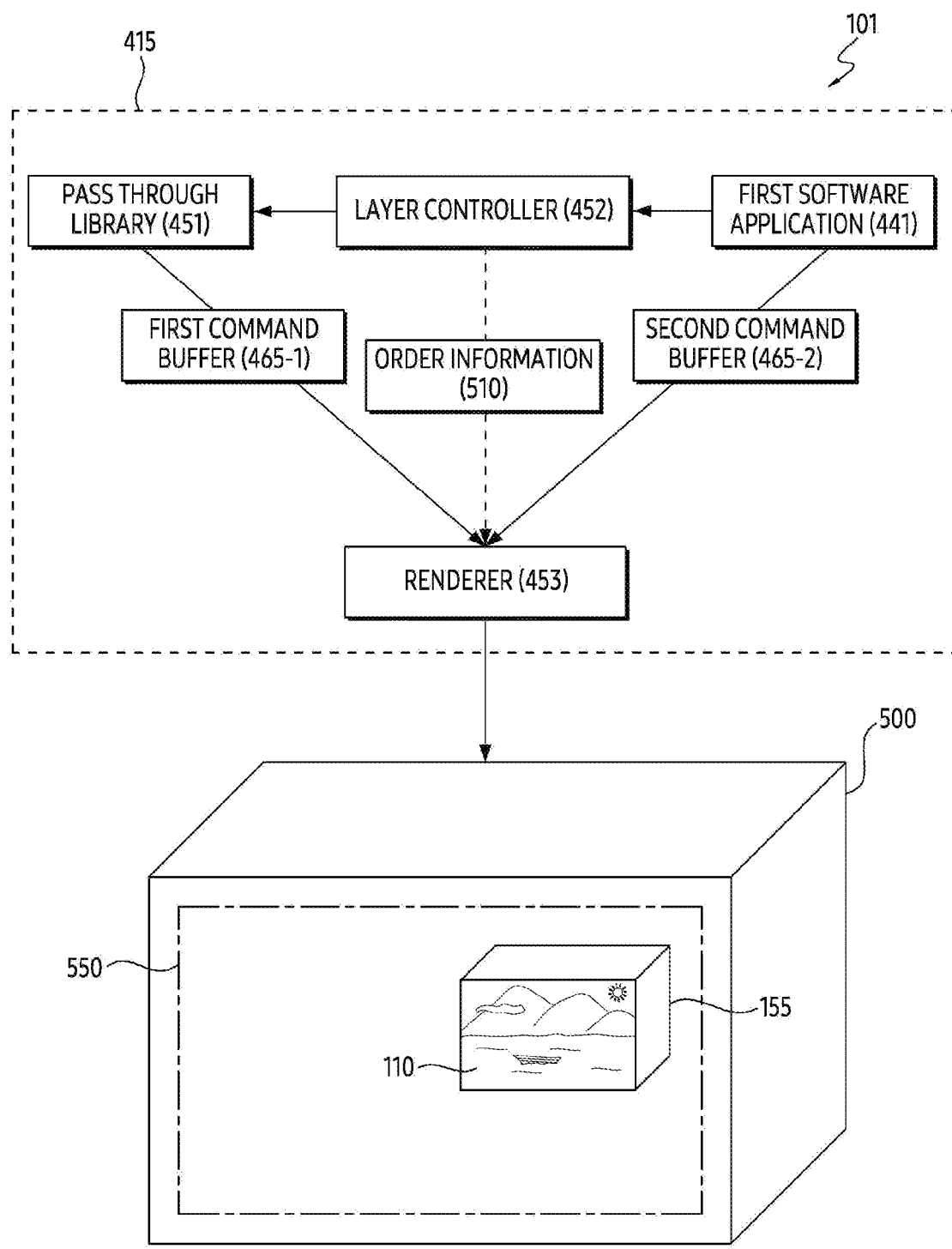
FIG. 5 is a diagram illustrating an example operation in which a wearable device renders a screen based on identifying interaction between one or more programs, according to an embodiment.

FIG. 5 is a diagram illustrating an example operation in which a wearable device renders a screen based on identifying interaction between one or more programs, according to an embodiment. The wearable device 101 of FIG. 5 may include the wearable device 101 of FIGS. 1 to 4. An operation performed by the wearable device 101 of FIG. 5 may be performed by one or more of at least one processor 410 of FIG. 4. Referring to FIG. 5, according to an embodiment, an example of one or more programs installed in the memory 415 of the wearable device 101 is illustrated.

According to an embodiment, the wearable device 101 may obtain a three-dimensional image (e.g., the three-dimensional image 150 in FIG. 1) corresponding to a virtual space, based on execution of a first software application 441. The wearable device 101 may store the three-dimensional image in a second command buffer 465-2, to render the three-dimensional image using a renderer 453. The three-dimensional image stored in the second command buffer 465-2 may be processed by the renderer 453. For example, the second command buffer 465-2 may include the third command buffer 465-3 of FIG. 2 from in terms of including a virtual object provided by the first software application 441.

For example, the wearable device 101 may receive an input to identify an external space, while displaying a three-dimensional image using the first software application 441. Based on receiving the input, the wearable device 101 may process data indicating the input using a layer controller 452. The wearable device 101 may initiate driving the camera based on processing data indicating the input using the layer controller 452. The wearable device 101 may generate data that requests the external image to be stored in the first command buffer 465-1, based on obtaining an external image (e.g., the external image 110 in FIG. 1) using a camera. Based on processing data requesting the external image to be stored in the first command buffer 465-1 through the pass through library 451, the wearable device 101 may store the external image in the first command buffer 465-1. For example, an external image obtained using a camera may have color information from among depth information or the color information corresponding to the external image.

For example, the wearable device 101 may obtain an order of the first command buffer 465-1 and/or the second command buffer 465-2 using the layer controller 452. The order may refer, for example, to an order for displaying an external image on a virtual object included in the three-dimensional image. The virtual object included in the three-dimensional image may include a virtual object displayed on the three-dimensional image. Based on obtaining an order, the wearable device 101 may provide the renderer 453 with order information 510 indicating the order, in order to be processed by the renderer 453.

For example, the wearable device 101 may perform rendering to obtain a screen (e.g., the screen 130 of FIG. 1) based on the renderer 453, using order information 510 provided from the first command buffer 465-1 provided from the pass through library 451, the second command buffer 465-2 provided from the first software application 441, and/or the layer controller 452. Based on the order information 510, the wearable device 101 may obtain a screen 550 displayed by superimposing an external image included in the first command buffer 465-1 and a three-dimensional image included in the second command buffer 465-2 (or the virtual object 155).

For example, the wearable device 101 may obtain the screen 550 corresponding to a gaze of a user (e.g., the user 105 of FIG. 1) in a virtual space 500 corresponding to a three-dimensional image. The screen 550 may correspond to the screen 130 of FIG. 1. The screen 550 may include at least a part of a three-dimensional image, at least a part of an external image, and/or a virtual object 155. For example, based on the order, the wearable device 101 may obtain a screen 550 by performing rendering, to be displayed an external image on the three-dimensional image (or the virtual object 155). Information on the screen 550 may be stored in a display buffer (e.g., the display buffer 467 of FIG. 4) distinct from the command buffer.

For example, based on order between the first command buffer 465-1 and the second command buffer 465-2, the wearable device 101 may identify whether to display an external image included in the first command buffer 465-1 on a virtual object or under the virtual object 155 (or the three-dimensional image included in the second command buffer 465-2). For example, the wearable device 101 may display the external image on at least a part of the virtual object 155. The wearable device 101 may warp a shape of the external image to display the external image on at least a part of the virtual object 155. The wearable device 101 may change at least one of a size or a shape of the external image to match at least part of the virtual object 155. For example, the wearable device 101 may change a size and/or a shape of an external image based on the FoV of the camera, based on a size and/or a shape of the virtual object 155 displayed by the screen 550.

For example, the wearable device 101 may not require depth information on the external image 110 to display the external image 110 in which a size and/or a shape on the virtual object 155 is changed. The wearable device 101 may display the external image 110 and the virtual object 155 on the display using an order for superimposing and displaying the external image 110 and the virtual object 155 on the display, independently of depth information on the external image 110 and depth information on the virtual object 155.

For example, using information on the virtual space 500, the wearable device 101 may arrange the virtual object 155 on a location of the virtual space. When a user of the wearable device 101 changes a gaze (e.g., a position of the head) based on the wearable device 101 arranging the virtual object 155 at a location in virtual space, the screen 550 corresponding to the gaze may not include the virtual object 155 (and the external image 110 displayed on the virtual object 155).

For example, the wearable device 101 may arrange the virtual object 155 at a location on the screen 550 based on the user's FoV. When the user of the wearable device 101 changes the gaze in state that the virtual object 155 is arranged at a location of the screen 550, the screen 550 corresponding to the changed gaze above may include the virtual object 155 (and the external image 110 displayed on the virtual object 155). When the wearable device 101 arranges the virtual object 155 at a location of the screen 550, the virtual object 155 arranged at a location of the screen 550 may be referred to a user interface for identifying the external image 110.

As described above, according to an embodiment, the wearable device 101 may store the external image 110 obtained through a camera based on the pass through library 451 located outside the layer controller 452 in the first command buffer 465-1. The wearable device 101 may store the external image 110 in the first command buffer 465-1 accessible through the renderer 453 and/or the layer controller 452, by the pass through library 451 distinct from the renderer 453 and/or the layer controller 452.

Hereinafter, an example of an operation in which the wearable device 101 stores information on the screen 550 obtained by performing rendering in the display buffer will be described in greater detail below with reference to FIG. 6.

Figure 6:
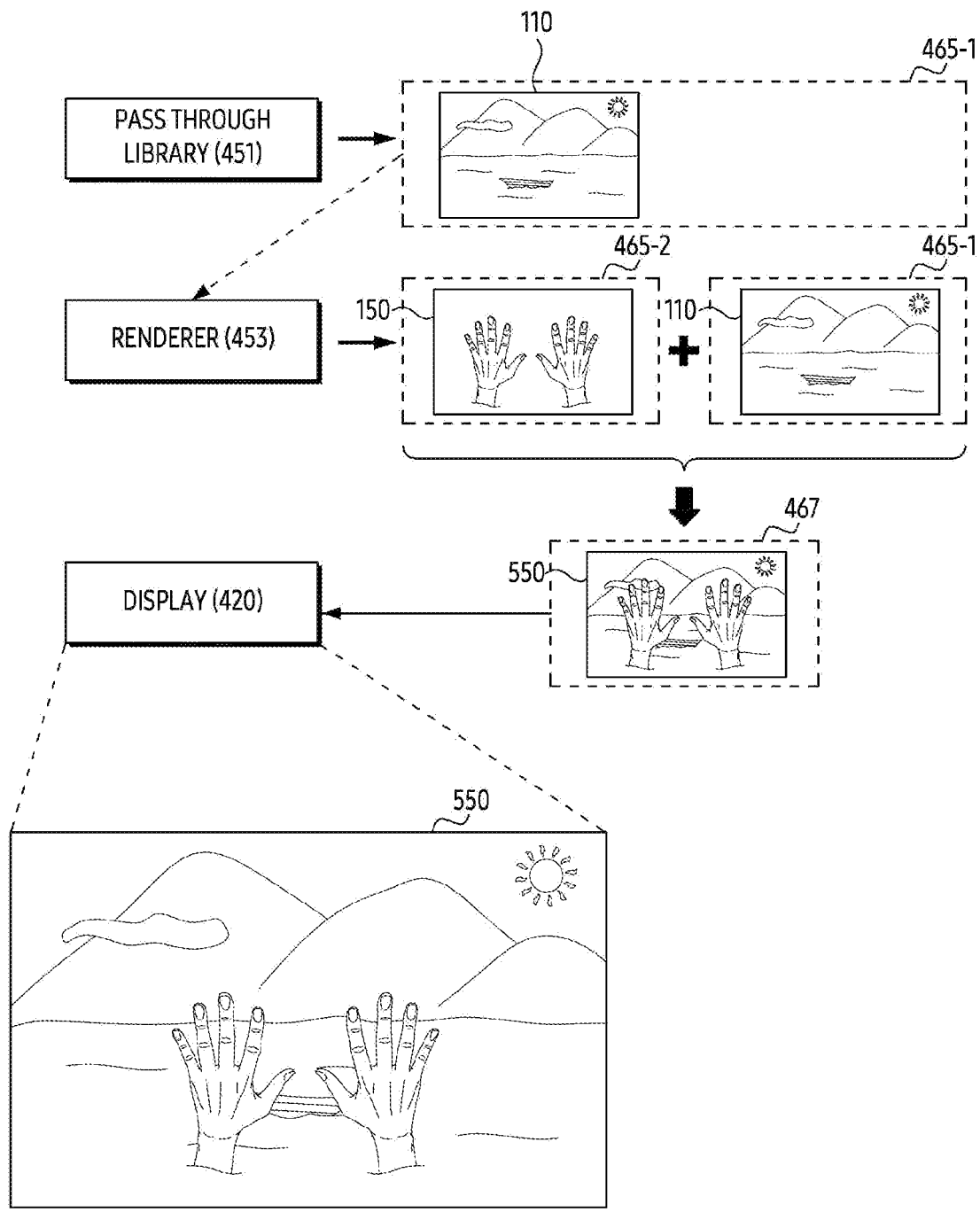
FIG. 6 is a diagram illustrating an example operation in which a wearable device renders a screen to be displayed on a display using a command buffer, according to an embodiment.

FIG. 6 is a diagram illustrating an example operation in which a wearable device renders a screen to be displayed on a display using a command buffer, according to an embodiment. The wearable device 101 of FIG. 6 may include the wearable device 101 of FIGS. 1 to 5. Operation performed by the wearable device 101 of FIG. 6 may be performed by one or more of at least one processor 410 of FIG. 4.

Referring to FIG. 6, according to an embodiment, the wearable device 101 may store the external image 110 in the first command buffer 465-1 using the pass through library 451 installed in the memory 415. The wearable device 101 may perform rendering for the external image 110 stored in the first command buffer 465-1, using the renderer 453. For example, the wearable device 101 may identify the three-dimensional image 150 stored in the second command buffer 465-2 using the first software application 441 of FIG. 4, through the renderer 453.

For example, the external image 110 stored in the first command buffer 465-1 and the three-dimensional image 150 stored in the second command buffer 465-2 may be rendered by the renderer 453 based on a shape of a layer. Each of the external image 110 and the three-dimensional image 150 based on the shape of the layer may be referred to as an external image layer and a three-dimensional image layer, respectively. The wearable device 101 may render the screen 550 by superimposing the external image layer and the three-dimensional image layer. The wearable device 101 may identify an order for the external image layer and the three-dimensional image layer, using the order information 510 in FIG. 5. Hereinafter, an order for the image layer may correspond to an order for the command buffer. An operation in which by the wearable device 101 renders the screen by superimposing the image layers based on the order will be described in greater detail below with reference to FIG. 8.

For example, the wearable device 101 may store the screen 550 obtained using the external image 110 and/or the three-dimensional image 150 in the display buffer 467 based on an order between the first command buffer 465-1 and/or the second command buffer 465-2, using the renderer 453. For example, the wearable device 101 may display the screen 550 stored in the display buffer 467, through the display 420.

For example, the screen 550 may include the external images 110, the three-dimensional image 150, and/or the virtual object (e.g., the virtual object 155 in FIG. 1) that are superimposed based on the order. The screen 550 may include an external image layer corresponding to the external image 110, a three-dimensional image layer corresponding to the three-dimensional image 150, and/or a virtual object layer corresponding to the virtual object. For example, the wearable device 101 may adjust an order (e.g., order corresponding to the order information 510 of FIG. 5), using depth information for each of the external image layer, the three-dimensional image layer, and/or the virtual object layer. The depth information may refer to a distance to the layers (e.g., the external image layer, the three-dimensional image layer, and/or the virtual object layer) in the screen 550 from a body part (e.g., eye) of a user (e.g., the user 105 of FIG. 1) wearing the wearable device 101. However, it is not limited thereto. For example, the wearable device 101 may adjust an order of the layers using a depth sensor, independently of obtaining depth information on the external image 110.

Hereinafter, referring to FIG. 7, which is a diagram illustrating an example operation in which the wearable device 101 changes a location, a size, and/or a shape of the external image 110 for displaying the external image 110 on at least a part of the virtual object (e.g., the virtual object 155 in FIG. 1) according to an embodiment will be described below.

Figure 7:
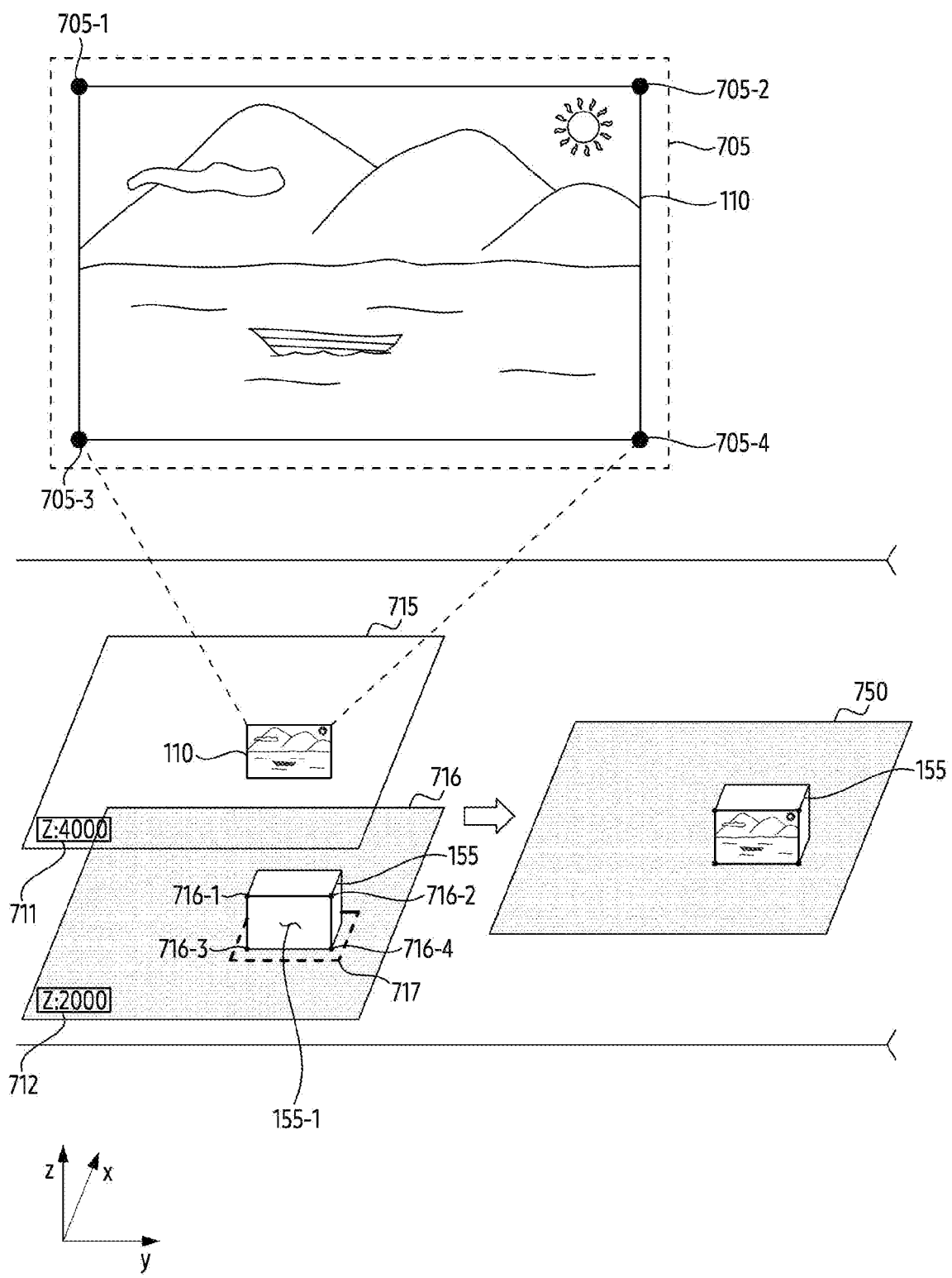
FIG. 7 is a diagram illustrating an example operation in which a wearable device displays an image on a virtual object using spatial information on a virtual environment, according to an embodiment.

FIG. 7 is a diagram illustrating an example operation in which a wearable device displays an image on a virtual object using spatial information on a virtual environment, according to an embodiment. The wearable device 101 of FIG. 7 may include the wearable device 101 of FIGS. 1 to 6. An operation performed by the wearable device 101 of FIG. 7 may be performed by one or more of at least one processor 410 of FIG. 4.

Referring to FIG. 7, according to an embodiment, the wearable device 101 may change the external image 110 included in the first command buffer 465-1 of FIG. 4 to match at least a part 155-1 of the virtual object 155 included in the second command buffer 465-2 of FIG. 4 (or the third command buffer 465-3 of FIG. 4). For example, the external image 110 may have a size based on FoV 705 of the camera. For example, the external image 110 may have a shape based on FoV 705 of the camera. However, it is not limited thereto. The external image 110 may be obtained based on a shape and/or a size of a display on which the external image 110 is to be displayed.

According to an embodiment, the wearable device 101 may obtain one or more layers 715 and 716 for rendering the external image 110 and the virtual object 115. For example, the wearable device 101 may obtain one or more layers 715 and 716, using a command buffer (e.g., the command buffer 465 in FIG. 4). The size and/or shape of each of the one or more layers 715 and 716 may be substantially the same. However, it is not limited thereto.

For example, each of the one or more layers 715 and 716) may include images (e.g., the external image 110, the three-dimensional images 150 in FIG. 1, and/or the virtual object 115). The one or more layers 715 and 716 may be used to obtain a screen (e.g., the screen 130 of FIG. 1). Each of the one or more layers 715 and 716 may be divided into an area including the images and an area not including the images. For example, the area including the images may be identified based on an alpha value (e.g., a parameter for adjusting transparency). Each of the one or more layers 715 and 716 may be divided based on a designated level to obtain a screen (e.g., the screen 130 of FIG. 1).

For example, the one or more layers 715 and 716 may include location information 711 and 712) (e.g., depth information) to be distinguished based on the designated level. The designated level may be identified based on the order information 510 of FIG. 5. The location information may be identified based on a three-dimensional coordinate system (e.g., a coordinate system including x-axis, y-axis, and z-axis). The wearable device 101 may obtain a layer 750 corresponding to a screen (e.g., the screen 130 of FIG. 1) based on mapping the location information of the one or more layers 715 and 716. The obtained layer 750 and information on the screen included in the layer 750 may be stored in the display buffer 467 of FIG. 4.

For example, the wearable device 101 may change a location, a shape, and/or a size of the external image 110 included in the layer 715. The wearable device 101 may change the location, the shape, and/or the size of the external image 110 based on a location, a shape, and/or a size of at least a part 155-1 of the virtual object 155. The at least a part 155-1 of the virtual object 155 may be an example of a part in which the external image 110 is to be superimposed.

For example, the wearable device 101 may identify the location information 717 of the virtual object 155 included in the layer 716. The wearable device 101 may identify the location information 717 of the virtual object 155, using spatial information (e.g., spatial information based on a three-dimensional coordinate system) of a three-dimensional image (e.g., the three-dimensional image 150 in FIG. 1) corresponding to the virtual object 155. The wearable device 101 may identify locations 716-1, 716-2, 716-3, and 716-4 corresponding to at least a part 155-1 of the virtual object 155 based on the location information 717 of the virtual object 155 and/or the shape of the virtual object 155. The wearable device 101 may identify locations 705-1, 705-2, 705-3, and 705-4 corresponding to the external image 110 to change a shape and/or a size of the external image 110 having a shape based on the FoV (705) of the camera.

For example, the wearable device 101 may map each of the locations 705-1, 705-2, 705-3, and 705-4 to each of the locations 716-1, 716-2, 716-3, and 716-4. The wearable device 101 may map each of the locations 705-1, 705-2, 705-3, and 705-4 to each of the locations 716-1, 716-2, 716-3, and 716-4 based on a shape of the external image 110 and a shape of at least a part 155-1 of the virtual object 155. For example, the wearable device 101 may map each of the locations 705-1, 705-2, 705-3, and 705-4 to each of the locations 716-1, 716-2, 705-3, and 705-4 by adjusting a relationship between the locations 705-1, 705-2, 705-3, and 716-4 based on a relationship between the locations 716-1, 716-2, 716-3, and 716-4. However, it is not limited thereto.

For example, the first location 705-1 of the external image 110 may be mapped to the first location 716-1 of at least a part 115-1 of the virtual object 155. The second location 705-2 of the external image 110 may be mapped to the second location 716-2 of at least a part 115-1 of the virtual object 155. The third location 705-3 of the external image 110 may be mapped to the third location 716-3 of at least a part 115-1 of the virtual object 155. The fourth location 705-4 of the external image 110 may be mapped to the fourth position 716-4 of at least a part 115-1 of the virtual object 155. The wearable device 101 may adjust a shape, a size, and/or a location of the external image 110 included in the layer 715, based on mapping each of the locations 705-1, 705-2, 705-3, and 705-4 to each of the locations 716-1, 716-2, 716-3, and 716-4. For example, the wearable device 101 may warp at least a part of the external image 110 to map the external image 110 onto the at least part 155-1. However, it is not limited thereto.

For example, the wearable device 101 may obtain the layer 750 corresponding to a screen (e.g., the screen 130 of FIG. 1) using the layer 715 and the layer 716 including the external image 110 in which a shape, a size, and/or a location are adjusted. The wearable device 101 may obtain the layer 750 based on superimposing the layer 715 and the layer 716. However, it is not limited thereto.

Hereinafter, an example of an operation in which the wearable device 101 obtains a screen (e.g., the screen 130 of FIG. 1) based on changing an order for the command buffer corresponding to each of one or more layers will be described in greater detail below with reference to FIG. 8.

Figure 8:
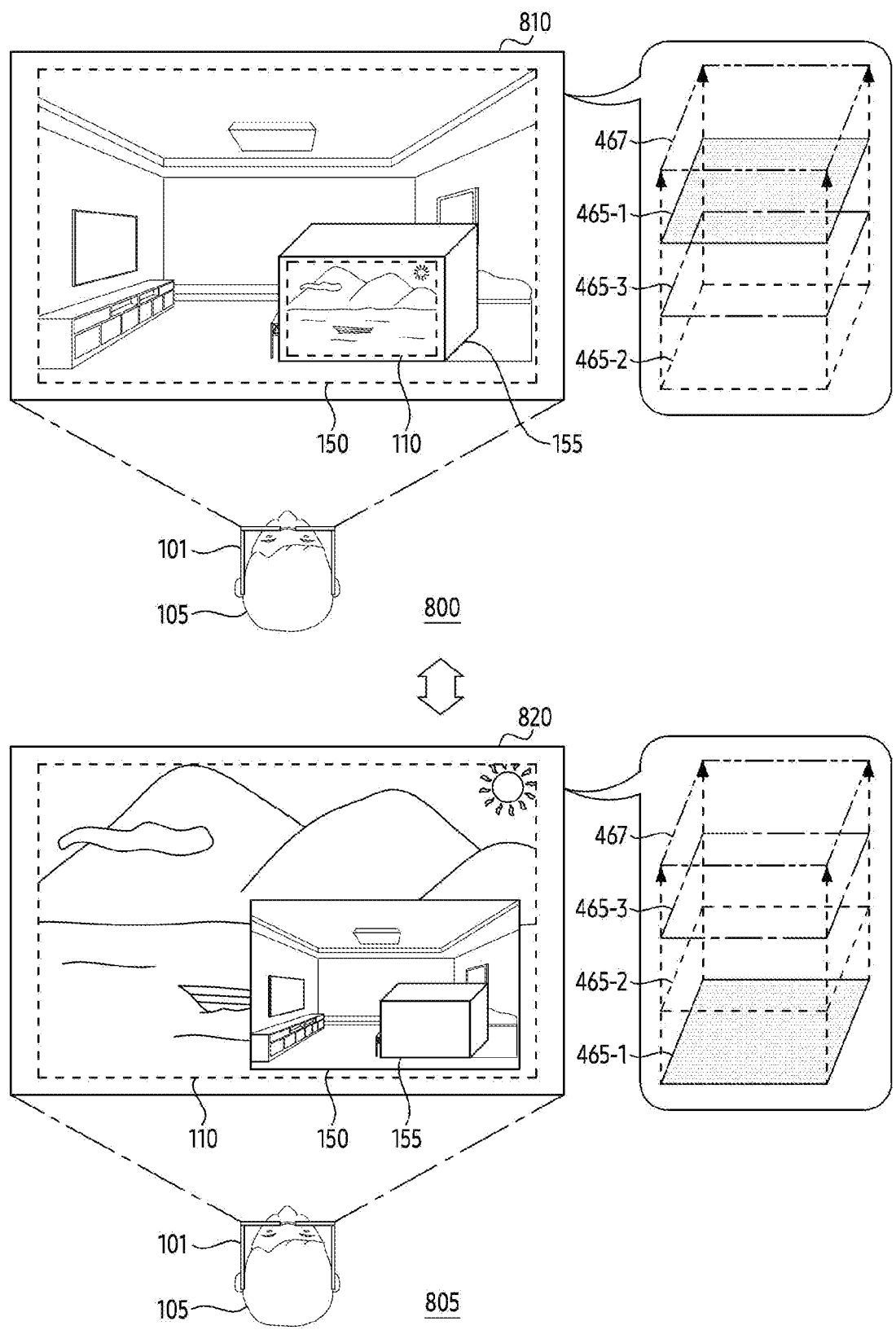
FIG. 8 is a diagram illustrating an example operation in which a wearable device displays a screen based on order information, according to an embodiment.

FIG. 8 is a diagram illustrating an example operation in which a wearable device displays a screen based on order information, according to various embodiments. The wearable device 101 of FIG. 8 may include the wearable device 101 of FIGS. 1 to 7. An operation performed by the wearable device 101 of FIG. 8 may be performed by one or more of at least one processor 410 of FIG. 4. Referring to FIG. 8, example states 800 and 805 in which the wearable device 101 displays at least one screen on the display based on an order of the command buffer (e.g., the command buffer 465 in FIG. 4) are illustrated.

According to an embodiment, in state 800, the wearable device 101 may display a screen 810 through the display based on an order of the command buffer. The screen 810 may include an external image 110, a three-dimensional image 150, and/or a virtual object 155.

For example, in state of displaying the three-dimensional image 150 on the display, the wearable device 101 may receive an input for obtaining the external image 110 through a camera, using a first software application (e.g., the software application 461 in FIG. 4) for providing the three-dimensional image 150. Based on receiving the input, the wearable device 101 may display the external image 110 obtained through the camera on at least a part of the virtual object 155 located on a position of the three-dimensional image 150. The wearable device 101 may store the external image 110 in the first command buffer 465-1 through the pass through library 451, in order to display the external image 110 on at least a part of the virtual object 155. The wearable device 101 may adjust an order of the first command buffer 465-1, the second command buffer 465-2 corresponding to the three-dimensional image 150, and/or the third command buffer 465-3 corresponding to the virtual object 155. The wearable device 101 may adjust the order so that the external image 110 is displayed on at least a part of the virtual object 155. For example, the first command buffer 465-1 may correspond to an external image layer (e.g., the layer 715 in FIG. 7) corresponding to an external image 110. For example, the second command buffer 465-2 may correspond to a three-dimensional image layer corresponding to a three-dimensional image 150. For example, the third command buffer 465-3 may correspond to a virtual object layer (e.g., the layer 716 in FIG. 7) corresponding to a virtual object 155. For example, the third command buffer 465-3 may include a system user interface (UI) for interacting with the user 105 based on an operating system (or the first software application 441) that provides a virtual environment service.

For example, the wearable device 101 may identify an order of the command buffer using location information (e.g., depth information) for each of layers (e.g., the external image layer, the three-dimensional image layer, and the virtual object layer). The wearable device 101 may stack the third command buffer 465-3 on the second command buffer 465-2 corresponding to the three-dimensional image 150. Based on stacking the third command buffer 465-3 on the second command buffer 465-2, the virtual object 155 may be located on the three-dimensional image 150. For example, the wearable device 101 may stack a layer indicating the virtual object 155 on a layer indicating a three-dimensional image 150. Based on stacking the layer indicating the virtual object 155 on the layer indicating the three-dimensional images 150, the virtual object 155 may be located on the three-dimensional images 150.

For example, the wearable device 101 may stack the first command buffer 465-1 on the third command buffer 465-3 to display the external image 110 on the virtual object 155. The wearable device 101 may stack a layer indicating the external image 110 on a layer indicating the virtual object 155. The wearable device 101 may change a shape and/or a size of the external image 110 based on a shape and/or a size of the virtual object 155 to display the external image 110 on the virtual object 155.

For example, the wearable device 101 may obtain the screen 810 by rendering the first command buffer 465-1, the second command buffer 465-2, and the third command buffer 465-3, using an order in which the third command buffer 465-3 and the first command buffer 465-1 are stacked, based on the second command buffer 465-2. The wearable device 101 may obtain the screen 810 by rendering the first layer, the second layer, and the third layer, using an order in which the second layer (e.g., a layer corresponding to the virtual object 155) stored in the third command buffer 465-3 and the third layer (e.g., a layer corresponding to the frame image 110) stored in the first command buffer 465-1, based on the first layer (e.g., a layer corresponding to the three-dimensional image 150) stored in the second command buffer 465-2, using an order in which a second layer (e.g., a layer corresponding to the virtual object 155) stored in the third command buffer 465-3 and a third layer (e.g., a layer corresponding to the frame image 110) stored in the first command buffer 465-1 are stacked. The wearable device 101 obtaining the screen 810 by rendering the first command buffer 465-1, the second command buffer 465-2, and the third command buffer 465-3 may include obtaining the screen 810 by rendering the external image 110, the three-dimensional image 150, and the virtual object 155. The wearable device 101 may display the screen 810 on the display based on storing the obtained information on the screen 810 in the display buffer 467.

According to an embodiment, the wearable device 101 may change an order of the command buffer. For example, the wearable device 101 may change a state in which the external image 110, the three-dimensional image 150, and/or the virtual object 155 are superimposed within at least one screen to be displayed on the display, based on changing the order.

For example, in the state 805, the wearable device 101 may display a screen 820 on which the three-dimensional image 150 is displayed on the external image 110. The wearable device 101 may identify an order between command buffers (e.g., the command buffer 465 of FIG. 4), based on stacking the second command buffer 465-2 on the first command buffer 465-1 and the third command buffer 465-3 on the second command buffer 465-2. Based on the order, the wearable device 101 may obtain the screen 820, using images (e.g., the external image 110, the three-dimensional image 150, and/or the virtual object 155 included in the command buffer. The screen 820 may be displayed on the display based on being stored in the display buffer 467.

As described above, according to an embodiment, the wearable device 101 may provide the user 105 with functions capable of displaying the external image 110 in a virtual environment, based on changing an order of the command buffer 465 (or an image layer corresponding to the command buffer 465). Based on changing the order, the wearable device 101 may provide a user 105 with a virtual environment service capable of interacting with a real environment corresponding to the external image 110 using the functions in the virtual environment.

Figure 9:
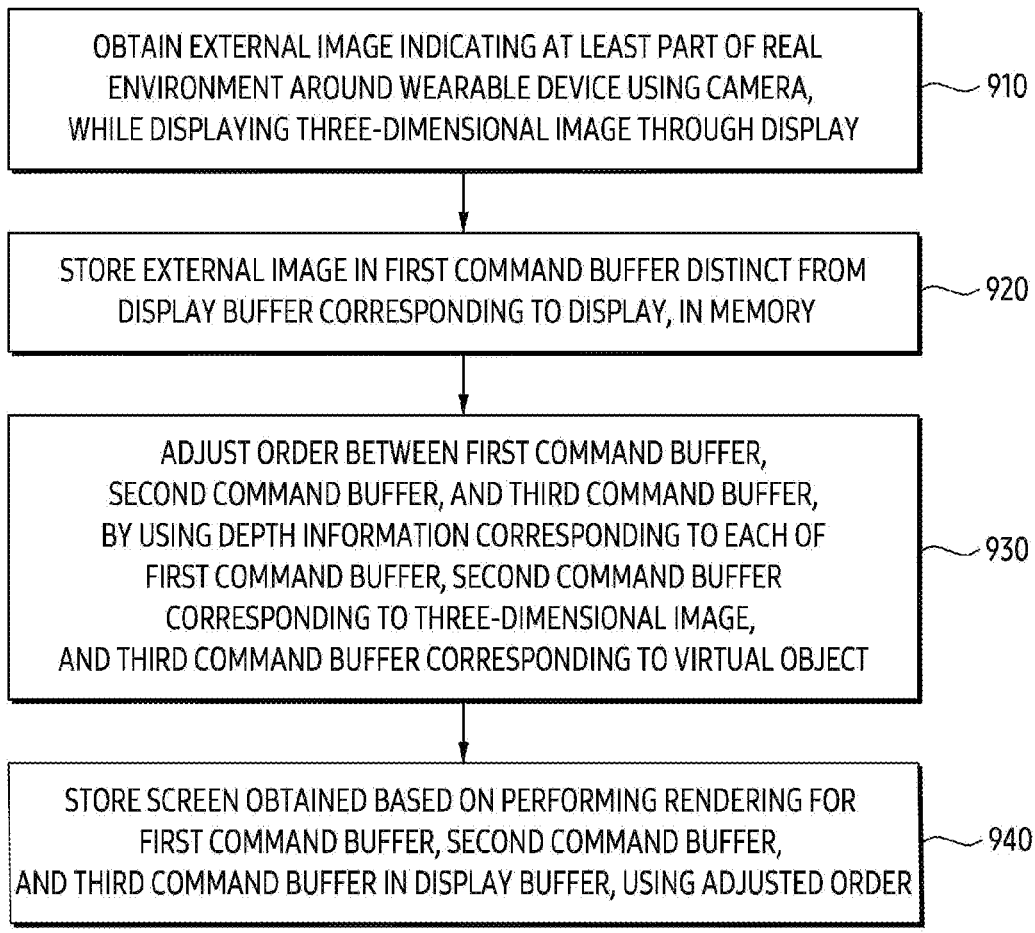
FIG. 9 is a flowchart illustrating an example operation of a wearable device, according to an embodiment.

FIG. 9 is a flowchart illustrating an example operation of a wearable device, according to an embodiment. At least one of operations of FIG. 9 may be performed by the wearable device 101 of FIG. 4 and/or one or more of at least one processor 410 of FIG. 4. Each operation of FIG. 9 may be performed sequentially, but is not necessarily performed sequentially. For example, the sequence of each operation may be changed, and at least two operations may be performed in parallel.

Referring to FIG. 9, according to an embodiment, in operation 910, the wearable device may obtain an external image (e.g., the external image 110 in FIG. 1) indicating at least a part of a real environment around the wearable device using a camera (e.g., the camera 430 in FIG. 4), while displaying a three-dimensional image (e.g., the three-dimensional image 150 in FIG. 1) through a display (e.g., the display 420 in FIG. 4). For example, the wearable device may obtain an external image having color information from among depth information or the color information corresponding to the external image, using a camera. For example, the wearable device 101 may obtain the external image while temporarily stopping obtainment of depth information that uses a depth sensor.

Referring to FIG. 9, according to an embodiment, in operation 920, the wearable device may store the external image in a first command buffer (e.g., the first command buffer 465-1) distinct from a display buffer (e.g., the display buffer 467 in FIG. 4) corresponding to a display, in a memory (e.g., the memory 415 of FIG. 4). For example, in order to render an external image stored in the first command buffer, the wearable device 101 may process the external image using the renderer 453 of FIG. 4 through the pass through library 451 of FIG. 4.

Referring to FIG. 9, according to an embodiment, in operation 930, the wearable device may adjust an order between a first command buffer, a second command buffer, and a third command buffer, using depth information (e.g., the location information 711, 712 in FIG. 7) corresponding to each of the first command buffer, the second command buffer (e.g., the second command buffer 465-2 of FIG. 4) corresponding to a three-dimensional image, and the third command buffer (e.g., the third command buffer 465-3 of FIG. 4) corresponding to a virtual object. For example, in order to display an external image on at least a part of a virtual object displayed on a location in a virtual environment corresponding to a three-dimensional image, the wearable device may adjust an order of the first command buffer, the second command buffer (e.g., the second command buffer 465-2 in FIG. 4) corresponding to the three-dimensional image, and the third command buffer (the third command buffer 465-3 in FIG. 4) corresponding to the virtual object. For example, the wearable device may superimpose on the at least a part of the three-dimensional image and the virtual object, and adjust the order, based on identifying an input for displaying an external image. The input may include an input for obtaining an external image using a camera.

Referring to FIG. 9, according to an embodiment, in operation 940, the wearable device may obtain a screen (e.g., the screen 130 of FIG. 1) to be stored in the display buffer and to be displayed through the display, by performing rendering for the first command buffer, the second command buffer, and the third command buffer using the adjusted order. The screen may include the external image, the virtual object, and the three-dimensional image superimposed based on the adjusted order. For example, the wearable device may change a shape of the external image corresponding to FoV of the camera using a shape of the virtual object included in the third command buffer, based on location information of the virtual object displayed on a location of the three-dimensional image. For example, the location information of the virtual object may be obtained using spatial information on a virtual environment corresponding to a three-dimensional image. For example, the wearable device may change a shape of the external image based on a shape of at least a part of a virtual object using location information of the virtual object. For example, the wearable device may obtain a rendered screen, based on changing a size of the external image corresponding to the FoV of a camera to a size of the at least a part of the virtual object. However, it is not limited thereto. For example, the wearable device may change an order of the command buffer (or layers corresponding to the command buffer) so that the three-dimensional image is displayed on the external image.

Metaverse may refer, for example, to a combination of the English words Meta, which may refer, for example, to "virtual" and "transcendence," and "Universe," which may refer, for example, to the universe, and to a three-dimensional virtual world where social, economic, and cultural activities like the real world take place. Metaverse is a concept that has evolved further than virtual reality, and it is characterized using, for example, avatars to not only enjoy games or virtual reality (VR, cutting-edge technology that enables people to experience real-life experiences in a computerized virtual world), but also social and cultural activities like real reality. Metaverse service may provide media content for enhancing immersion in the virtual world, based on augmented reality (AR), virtual reality environment (VR), mixed environment (MR) and/or extended reality (XR).

For example, media content provided by the metaverse service may include social interaction content including a game, a concert, a party, and/or meeting based on avatar. For example, the media content may include advertisements, user created content, and/or information for economic activities such as selling of productions and/or shopping. Ownership of the user created content may be proven by a non-fungible token (NFT) based on blockchain. Metaverse services may support economic activities based on real money and/or cryptocurrency. Virtual content linked to the real world, such as digital twin or life logging, may be provided by the metaverse service.

Figure 10:
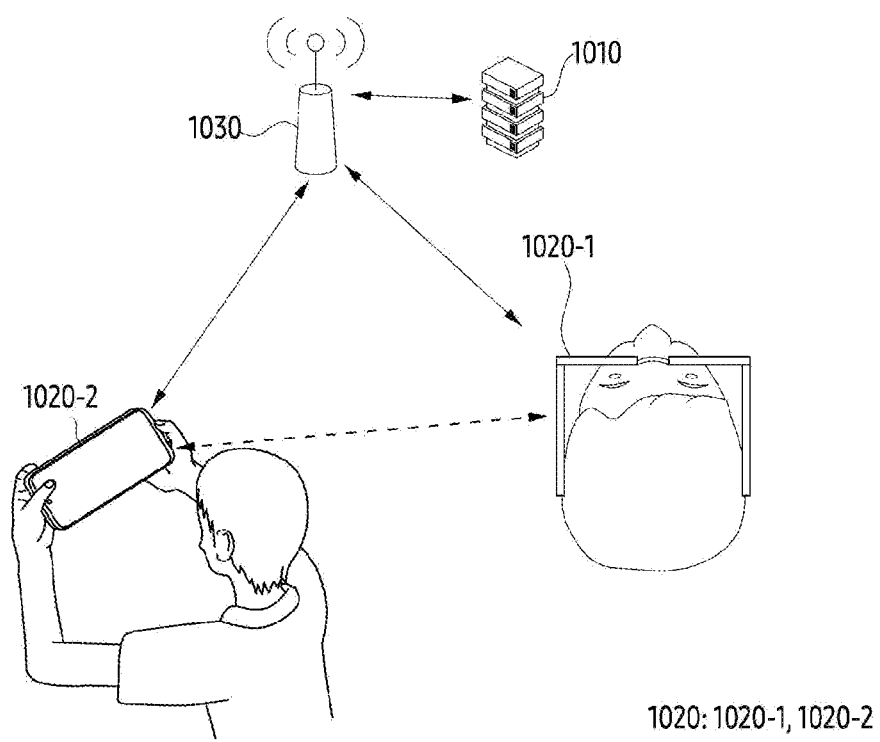
FIG. 10 is a diagram illustrating an example of a network environment that receives a metaverse service through a server according to an embodiment.

FIG. 10 is a diagram illustrating an example of a network environment 1001 that receives a metaverse service through a server 1010, according to an embodiment.

Referring to FIG. 10, the network environment 1001 may include the server 1010, a user terminal 1020 (e.g., a first terminal 1020-1 and a second terminal 1020-2), and a network connecting the server 1010 with the user terminal 1020. In the network environment 1001, the server 1010 may provide a metaverse service to the user terminal 1020. The network may be formed by at least one intermediate node 1030 including an access point (AP) and/or a base station. The user terminal 1020 may access the server 1010 through the network and output a user interface (UI) related to the metaverse service to a user of the user terminal 1020. Based on the UI, the user terminal 1020 may obtain information to be input to the metaverse service from the user or output information (e.g., multimedia content) related to the metaverse service to the user.

In this case, the server 1010 provides a virtual space so that the user terminal 1020 may perform activities in the virtual space. In addition, the user terminal 1020 may represent information provided by the server 1010 to the user, or transmit information that the user wants to represent in the virtual space to the server, by installing S/W agent to access the virtual space provided by the server 1010. The S/W agent may be provided directly through the server 1010, downloaded from a public server, or embedded when purchasing a terminal.

In an embodiment, the metaverse service may be provided to the user terminal 1020 and/or the user using the server 1010. The embodiment is not limited thereto, and the metaverse service may be provided through an individual contact between users. For example, in the network environment 1001, the metaverse service may be provided by a direct connection between the first terminal 1020-1 and the second terminal 1020-2, independently of the server 1010. Referring to FIG. 10, in the network environment 1001, the first terminal 1020-1 and the second terminal 1020-2 may be connected to each other through a network formed by at least one intermediate node 1030. In an embodiment in which the first terminal 1020-1 and the second terminal 1020-2 are directly connected, any one of the first terminal 1020-1 and the second terminal 1020-2 may serve as the server 1010. For example, a metaverse environment may be formed solely by device-to-device connection (e.g., peer-to-peer (P2P) connection).

In an embodiment, the user terminal 1020 (or the user terminal 1020 including the first terminal 1020-1 and the second terminal 1020-2) may be made of various form factors, and include an output device that provides video or/and sound to the user and an input device for inputting information to the metaverse service. Examples of various form factors of the user terminal 1020 may include a smartphone (e.g., the second terminal 1020-2), an AR device (e.g., the first terminal 1020-1), a VR device, an MR device, a video see through (VST) device, an optical see through (OST) device, a smart lens, a smart mirror, and TV or projector with input/output capability.

A network of the disclosure (e.g., a network formed by at least one intermediate node 1030) includes various broadband networks including 3G, 4G, and 5G, and a short-range network (e.g., a wired network or a wireless network that directly connects the first terminal 1020-1 and the second terminal 1020-2) including Wifi, BT, and the like. The user terminal 1020 may be referred to the wearable device 101 of FIGS. 1 to 9.

According to an embodiment, the wearable device may display an image corresponding to an external space on a part of a virtual space while providing a virtual space service. A method for a wearable device to display an image corresponding to an external space on a part of a virtual space may be required.

As described above, according to an example embodiment, a wearable device (e.g., a wearable device 101) may comprise: memory (e.g., a memory 415) including one or more storage mediums storing instructions, a display (e.g., a display 420), a camera (e.g., a camera 430), and at least one processor (e.g., a processor 410) including processing circuitry. The instructions that, when executed by the at least one processor individually or collectively, may cause the wearable device to obtain an external image (e.g., an external image 110) indicating at least a part of real environment around the wearable device using the camera, while displaying a three-dimensional image (e.g., a three-dimensional image 150) through the display. The instructions that, when executed by the at least one processor individually or collectively, may cause the wearable device to store the external image in a first command buffer (e.g., a first command buffer 465-1) distinct from a display buffer (e.g., a display buffer 467) corresponding to the display in the memory. The instructions that, when executed by the at least one processor individually or collectively, may cause the wearable device to adjust an order among the first command buffer, the second command buffer and the third command buffer, using depth information (e.g., location information 711; 712) corresponding to the first command buffer, a second command buffer (e.g., a second command buffer 465-2) corresponding to the three-dimensional image, and a third command buffer (e.g., a third command buffer 465-3) corresponding to a virtual object. The instructions that, when executed by the at least one processor individually or collectively, may cause the wearable device to obtain a screen (e.g., a screen 130; 550), to be displayed in the display and stored in the display buffer, by performing rendering on the first command buffer, the second command buffer, and the third command buffer using the adjusted order.

For example, to obtain the screen, the instructions that, when executed by the at least one processor individually or collectively, may cause the wearable device to change a shape of the external image corresponding to field of view (FoV) (e.g., an FoV 705) of the camera, using a shape of the virtual object included in the third command buffer, based on location information (e.g., location information 717) of the virtual object displayed on a location.

For example, to change the shape of the external image, the instructions that, when executed by the at least one processor individually or collectively, may cause the wearable device to obtain the location information of the virtual object, using space information for virtual space corresponding to the three-dimensional image. To change the shape of the external image, the instructions that, when executed by the at least one processor individually or collectively, may cause the wearable device to change the shape of the external image, based on a shape of at least a part of the virtual object, using the location information of the virtual object.

For example, to obtain the screen, the instructions that, when executed by the at least one processor individually or collectively, may cause the wearable device to obtain the rendered screen based on changing a size of the external image corresponding to the FoV of the camera to a size of the at least part of the virtual object.

For example, to adjust the order, the instructions that, when executed by the at least one processor individually or collectively, may cause the wearable device to adjust the order, to display the external image on at least part (e.g., at least part 155-1;157) of the virtual object displayed on a location of the three-dimensional image.

For example, to adjust the order, the instructions that, when executed by the at least one processor individually or collectively, may cause the wearable device to adjust the order, based on identifying an input for displaying the external image, by superimposing the three-dimensional image and at least part of the virtual object.

For example, the screen may include the external image, the virtual object, and the three-dimensional image, superimposed based on the order.

For example, to obtain the external image, the instructions that, when executed by the at least one processor individually or collectively, may cause the wearable device to obtain the external image having color information from among the color information or depth information corresponding to the external image, using the camera.

As described above, according to an example embodiment, a method by performed a wearable device (e.g., a wearable device 101) may comprise obtaining an external image (e.g., an external image 110) indicating at least a part of real environment around the wearable device using a camera (e.g., a camera 430), while displaying a three-dimensional image (e.g., a three-dimensional image 150) through a display (e.g., a display 420). The method may comprise storing the external image in a first command buffer (e.g., a first command buffer 465-1) distinct from a display buffer (e.g., a display buffer 467) corresponding to the display in a memory (e.g., a memory 415). The method may comprise adjusting an order among the first command buffer, the second command buffer and the third command buffer, using depth information (e.g., location information 711; 712) corresponding to the first command buffer, a second command buffer (e.g., a second command buffer 465-2) corresponding to the three-dimensional image, and a third command buffer (e.g., a third command buffer 465-3) corresponding to a virtual object. The method may comprise obtaining a screen (e.g., a screen 130; 550) to be displayed in the display and stored in the display buffer, by performing rendering on the first command buffer, the second command buffer, and the third command buffer using the adjusted order.

For example, the obtaining the screen may comprise changing a shape of the external image corresponding to field of view (FoV) (e.g., an FoV 705) of the camera, using a shape of the virtual object included in the third command buffer, based on location information (e.g., location information 717) of the virtual object displayed on a location.

For example, changing the shape of the external image may comprise obtaining the location information of the virtual object, using space information for virtual space corresponding to the three-dimensional image. Changing the shape of the external image may comprise changing the shape of the external image, based on a shape of at least a part of the virtual object, using the location information of the virtual object.

For example, the obtaining the screen may comprise obtaining the rendered screen based on changing a size of the external image corresponding to the FoV of the camera to a size of the at least part of the virtual object.

For example, the adjusting the order may comprise adjusting the order, to display the external image on at least part (e.g., at least part 155-1;157) of the virtual object displayed on a location of the three-dimensional image.

For example, the adjusting the order may comprise adjusting the order, based on identifying an input for displaying the external image, by superimposing the three-dimensional image and at least part of the virtual object.

For example, the screen may include the external image, the virtual object, and the three-dimensional image, superimposed based on the order.

As described above, according to an example embodiment, a non-transitory computer-readable storage medium storing one or more programs, the one or more programs, when executed by one or more of at least one processor (e.g., a processor 410) of a wearable device (e.g., a wearable device 101), may cause the wearable device to obtain an external image (e.g., an external image 110) indicating at least a part of real environment around the wearable device using a camera (e.g., a camera 430), while displaying a three-dimensional image (e.g., a memory 415) through a display (e.g., a display 420). The one or more programs, when executed by one or more of at least one processor of the wearable device, may cause the wearable device to store the external image in a first command buffer (e.g., a first command buffer 465-1) distinct from a display buffer (e.g., a display buffer 467) corresponding to the display in a memory (e.g., a memory 415). The one or more programs, when executed by one or more of at least one processor of the wearable device, may cause the wearable device to adjust an order among the first command buffer, the second command buffer and the third command buffer, using depth information (e.g., location information 711; 712) corresponding to the first command buffer, a second command buffer (e.g., a second command buffer 465-2) corresponding to the three-dimensional image, and a third command buffer (e.g., a third command buffer 465-3) corresponding to a virtual object. The one or more programs, when executed by one or more of at least one processor of the wearable device, may cause the wearable device to obtain a screen (e.g., a screen 130; 550), to be displayed in the display and stored in the display buffer, by performing rendering on the first command buffer, the second command buffer, and the third command buffer using the adjusted order.

For example, in order to obtain the screen, the one or more programs, when executed by one or more of at least one processor of the wearable device, may cause the wearable device to change a shape of the external image corresponding to field of view (FoV) (e.g., a FoV 705) of the camera, using a shape of the virtual object included in the third command buffer, based on location information (e.g., a location information 717) of the virtual object displayed on a location.

For example, to change the shape of the external image, the one or more programs, when executed by one or more of at least one processor of the wearable device, may cause the wearable device to obtain the location information of the virtual object, using space information for virtual space corresponding to the three-dimensional image. To change the shape of the external image, the one or more programs, when executed by one or more of at least one processor of the wearable device, may cause the wearable device to change the shape of the external image, based on a shape of at least a part of the virtual object, using the location information of the virtual object.

For example, to obtain the screen, the one or more programs, when executed by one or more of at least one processor of the wearable device, may cause the wearable device to obtain the rendered screen based on changing a size of the external image corresponding to the FoV of the camera to a size of the at least part of the virtual object.

For example, to adjust the order, the one or more programs, when executed by one or more of at least one processor of the wearable device, may cause the wearable device to adjust the order, to display the external image on at least part (e.g., at least part 155-1; 157) of the virtual object displayed on a location of the three-dimensional image.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floptical disks, ROMs, RAMs, flash memories, and the like to store program instructions. Examples of other media include app stores that distribute applications, sites that supply or distribute various software, and recording media or storage media managed by servers.

Although embodiments have been described according to various example embodiments and drawings as above, various modifications and modifications are possible from the above description to those of ordinary skill in the art. For example, even if the described techniques are performed in a different order from the described method, and/or components such as the described system, structure, device, circuit, and the like are combined or combined in a different form from the described method or are substituted or substituted by other components or equivalents, appropriate results may be achieved.

Therefore, other implementations, other embodiments, and equivalents to the claims fall within the scope of the disclosure, including the appended claims and their equivalents. It will also be understood that any of the embodiment(s) described herein may be used in conjunction with any other embodiment(s) described herein.

What is claimed is:

1. A wearable device, comprising:
   memory including one or more storage mediums storing instructions;
   a display;
   a camera; and
   at least one processor including processing circuitry;
   wherein the instructions that, when executed by the at least one processor individually or collectively, cause the wearable device to:
   obtain an external image indicating at least a part of real environment around the wearable device using the camera, while displaying a three-dimensional image through the display;
   store the external image in a first command buffer distinct from a display buffer corresponding to the display in the memory;
   using depth information corresponding to the first command buffer, a second command buffer corresponding to the three-dimensional image, and a third command buffer corresponding to a virtual object, adjust an order among the first command buffer, the second command buffer and the third command buffer; and
   obtain a screen, to be displayed in the display and stored in the display buffer, by performing rendering on the first command buffer, the second command buffer, and the third command buffer using the adjusted order.

2. The wearable device of claim 1,
   wherein the instructions that, when executed by the at least one processor individually or collectively, cause the wearable device to:
   change a shape of the external image corresponding to field of view (FoV) of the camera, using a shape of the virtual object included in the third command buffer, based on location information of the virtual object displayed on a location.

3. The wearable device of claim 2,
   wherein the instructions that, when executed by the at least one processor individually or collectively, cause the wearable device to:
   obtain the location information of the virtual object, using space information for virtual space corresponding to the three-dimensional image, and
   change the shape of the external image, based on a shape of at least a part of the virtual object, using the location information of the virtual object.

4. The wearable device of claim 1,
wherein the instructions that, when executed by the at least one processor individually or collectively, cause the wearable device to:
obtain the rendered screen based on changing a size of the external image corresponding to the FoV of the camera to a size of the at least part of the virtual object.

5. The wearable device of claim 1,
wherein the instructions that, when executed by the at least one processor individually or collectively, cause the wearable device to:
adjust the order, to display the external image on at least part of the virtual object displayed on a location of the three-dimensional image.

6. The wearable device of claim 1,
wherein the instructions that, when executed by the at least one processor individually or collectively, cause the wearable device to:
adjust the order, based on identifying an input for displaying the external image, by superimposing the three-dimensional image and at least part of the virtual object.

7. The wearable device of claim 1,
wherein the screen includes the external image, the virtual object, and the three-dimensional image, superimposed based on the order.

8. The wearable device of claim 1,
wherein the instructions that, when executed by the at least one processor individually or collectively, cause the wearable device to:
obtain the external image having color information from among the color information or depth information corresponding to the external image, using the camera.

9. A method performed by a wearable device comprising:
obtaining an external image indicating at least a part of real environment around the wearable device using a camera, while displaying a three-dimensional image through a display;
storing the external image in a first command buffer distinct from a display buffer corresponding to the display in a memory;
using depth information corresponding to the first command buffer, a second command buffer corresponding to the three-dimensional image, and a third command buffer corresponding to a virtual object, adjusting an order among the first command buffer, the second command buffer and the third command buffer; and
obtaining a screen, to be displayed in the display and stored in the display buffer, by performing rendering on the first command buffer, the second command buffer, and the third command buffer using the adjusted order.

10. The method of claim 9, wherein the obtaining the screen comprises:
changing a shape of the external image corresponding to field of view (FoV) of the camera, using a shape of the virtual object included in the third command buffer, based on location information of the virtual object displayed on a location.

11. The method of claim 10, wherein changing the shape of the external image comprises:
obtaining the location information of the virtual object, using space information for virtual space corresponding to the three-dimensional image, and
changing the shape of the external image, based on a shape of at least a part of the virtual object, using the location information of the virtual object.

12. The method of claim 9, wherein the obtaining the screen comprises:
obtaining the rendered screen based on changing a size of the external image corresponding to the FoV of the camera to a size of the at least part of the virtual object.

13. The method of claim 9, wherein the adjusting the order comprises:
adjusting the order, to display the external image on at least part of the virtual object displayed on a location of the three-dimensional image.

14. The method of claim 9, wherein the adjusting the order comprises:
adjusting the order, based on identifying an input for displaying the external image, by superimposing the three-dimensional image and at least part of the virtual object.

15. The method of claim 9,
wherein the screen includes the external image, the virtual object, and the three-dimensional image, superimposed based on the order.

16. A non-transitory computer readable storage medium storing one or more programs, wherein the one or more programs, when executed by one or more of at least one processor of a wearable device, causes the wearable device to perform operations comprising:
obtaining an external image indicating at least a part of real environment around the wearable device using a camera, while displaying a three-dimensional image through a display;
storing the external image in a first command buffer distinct from a display buffer corresponding to the display in a memory;
using depth information corresponding to the first command buffer, a second command buffer corresponding to the three-dimensional image, and a third command buffer corresponding to a virtual object, adjusting an order among the first command buffer, the second command buffer and the third command buffer; and
obtaining a screen, to be display in the display and stored in the display buffer, by performing rendering on the first command buffer, the second command buffer, and the third command buffer using the adjusted order.

17. The non-transitory computer-readable storage medium of claim 16, wherein the one or more programs, when executed by one or more of at least one processor of a wearable device, causes the wearable device to perform operations comprising:
changing a shape of the external image corresponding to field of view (FoV) of the camera, using a shape of the virtual object included in the third command buffer, based on location information of the virtual object displayed on a location.

18. The non-transitory computer-readable storage medium of claim 17, wherein the one or more programs, when executed by one or more of at least one processor of a wearable device, causes the wearable device to perform operations comprising:
obtaining the location information of the virtual object, using space information for virtual space corresponding to the three-dimensional image, and
changing the shape of the external image, based on a shape of at least a part of the virtual object, using the location information of the virtual object.

19. The non-transitory computer-readable storage medium of claim 16, wherein the one or more programs, when executed by one or more of at least one processor of a wearable device, cause the wearable device to perform operations comprising:
   obtaining the rendered screen based on changing a size of the external image corresponding to the FoV of the camera to a size of the at least part of the virtual object.

20. The non-transitory computer-readable storage medium of claim 16, wherein the one or more programs, when executed by one or more of at least one processor of a wearable device, causes the wearable device to perform operations comprising:
   adjusting the order, to display the external image on at least part of the virtual object displayed on a location of the three-dimensional image.

* * * * *